(12) United States Patent
Berg

(10) Patent No.: US 7,673,711 B1
(45) Date of Patent: Mar. 9, 2010

(54) TRACKED VEHICLE

(75) Inventor: Norman O. Berg, Roseau, MN (US)

(73) Assignee: Polaris Industries Inc., Medina, MN (US)

( * ) Notice: Subject to any disclaimer, the term of this patent is extended or adjusted under 35 U.S.C. 154(b) by 980 days.

(21) Appl. No.: 10/454,879

(22) Filed: Jun. 4, 2003

Related U.S. Application Data

(60) Provisional application No. 60/386,025, filed on Jun. 4, 2002.

(51) Int. Cl.
B62D 55/04 (2006.01)

(52) U.S. Cl. .................................................. 180/9.21

(58) Field of Classification Search .................. 180/9.1, 180/9.21, 9.25, 908, 9.23, 903; 296/37.1; 440/12.5, 12.56, 12.58, 12.63, 12.64, 95; 224/401, 404, 408; D12/324; D21/542, D21/769

See application file for complete search history.

(56) References Cited

U.S. PATENT DOCUMENTS

| | | | |
|---|---|---|---|
| 1,338,059 A | | 4/1920 | White |
| 1,387,086 A | | 8/1921 | White |
| 1,397,314 A | | 11/1921 | Cox |
| 1,677,846 A | * | 7/1928 | Powell ..................... 440/12.58 |
| 1,700,384 A | * | 1/1929 | Stachnyk ..................... 440/75 |
| 1,741,878 A | | 12/1929 | Rasmussen |
| 1,992,702 A | | 2/1935 | Koop |
| 2,022,079 A | | 11/1935 | Eberhard |
| 2,397,791 A | * | 4/1946 | Kramer et al. ........... 440/12.57 |
| 2,466,236 A | * | 4/1949 | Hecker ..................... 440/12.56 |
| 2,637,603 A | | 5/1953 | Cartlidge |
| 3,014,766 A | | 12/1961 | Jansen |
| 3,101,805 A | | 8/1963 | Tritle |
| 3,158,220 A | | 11/1964 | Griffith |
| 3,177,840 A | * | 4/1965 | Reichart .................. 440/12.58 |
| 3,180,305 A | * | 4/1965 | Gower-Rempel ........ 440/12.56 |
| 3,266,591 A | * | 8/1966 | Sampietro et. al. ......... 180/68.1 |
| 3,318,403 A | | 5/1967 | Hansen |
| 3,336,994 A | | 8/1967 | Pederson |
| 3,369,624 A | | 2/1968 | Kauffmann |

(Continued)

FOREIGN PATENT DOCUMENTS

WO WO 76794 A1 * 12/2000

OTHER PUBLICATIONS

Article entitled PM Tests OMC's Secret Here's the first test report of any kind on a new type of all-terrrain vehicle planned by Outboard Marine Corporation. *Popular Mechanics*, dated Jun. 1969.

(Continued)

*Primary Examiner*—Lesley Morris
*Assistant Examiner*—Daniel Yeagley
(74) *Attorney, Agent, or Firm*—Baker & Daniels LLP

(57) ABSTRACT

The present invention relates generally to recreational vehicles. More particularly, the present invention relates to methods and apparatus for traversing challenging terrain with a recreational vehicle. A vehicle in accordance with an exemplary embodiment of the present invention comprises a first drive track that is supported by a first rear suspension and a second drive track of vehicle is supported by a second rear suspension. The first drive track and the second drive track may be operatively coupled to an engine by a drive train for propelling the vehicle.

22 Claims, 21 Drawing Sheets

U.S. PATENT DOCUMENTS

| | | | |
|---|---|---|---|
| 3,451,729 A | 6/1969 | Roy | |
| 3,464,743 A | 9/1969 | Hallaman | |
| 3,469,553 A * | 9/1969 | Gagne | 440/12.64 |
| 3,477,767 A | 11/1969 | McNeil | |
| 3,534,701 A * | 10/1970 | Hebert | 440/12.56 |
| 3,568,788 A * | 3/1971 | Mayeaux | 180/235 |
| 3,582,154 A | 6/1971 | Russ, Sr. | |
| 3,619,012 A | 11/1971 | Bizier et al. | |
| 3,622,209 A | 11/1971 | Leyden | |
| 3,637,266 A | 1/1972 | Busse | |
| 3,664,446 A | 5/1972 | Burtis et al. | |
| 3,664,451 A * | 5/1972 | Rogers et al. | 180/374 |
| 3,688,858 A | 9/1972 | Jespersen | |
| 3,728,909 A | 4/1973 | Jespersen | |
| RE27,642 E * | 5/1973 | Enos | 440/12.53 |
| 3,739,867 A | 6/1973 | Drawe | |
| 3,760,763 A * | 9/1973 | Brusacoram | 440/12.64 |
| 3,776,325 A | 12/1973 | Jespersen | |
| 3,783,958 A | 1/1974 | Canavan | |
| 3,790,230 A | 2/1974 | Jespersen | |
| 3,819,000 A | 6/1974 | Larsen | |
| 3,861,762 A | 1/1975 | Freedy et al. | |
| 3,870,379 A | 3/1975 | Payne | |
| 3,871,460 A | 3/1975 | Dehnert | |
| 3,872,938 A | 3/1975 | DeGroot | |
| 3,877,534 A | 4/1975 | Krause | |
| 3,879,092 A | 4/1975 | Rose | |
| 3,913,693 A | 10/1975 | Hale et al. | |
| 3,934,664 A | 1/1976 | Pohjola | |
| 3,945,451 A | 3/1976 | Aaen | |
| 3,966,004 A | 6/1976 | Rose | |
| 4,119,356 A | 10/1978 | Pohjola | |
| 4,135,470 A | 1/1979 | Ono | |
| 4,188,076 A | 2/1980 | Pohjola | |
| 4,222,453 A | 9/1980 | Fixsen et al. | |
| 4,387,661 A * | 6/1983 | Duff | 440/12.66 |
| 4,433,634 A | 2/1984 | Coast | |
| 4,453,611 A | 6/1984 | Stacy, Jr. | |
| 4,531,787 A | 7/1985 | Hart et al. | |
| 4,570,738 A * | 2/1986 | Grinde et al. | 180/196 |
| 4,613,006 A | 9/1986 | Moss et al. | |
| 4,616,724 A | 10/1986 | Lemke | |
| 4,618,015 A | 10/1986 | Yochum | |
| 4,635,740 A | 1/1987 | Krueger et al. | |
| 4,699,229 A | 10/1987 | Hirose et al. | |
| 4,706,769 A | 11/1987 | Latourelle et al. | |
| 4,714,126 A | 12/1987 | Shinozaki et al. | |
| 4,716,850 A * | 1/1988 | Lachance | 440/12.66 |
| 4,719,983 A | 1/1988 | Bruzzone | |
| 4,892,165 A | 1/1990 | Yasui et al. | |
| 4,893,692 A * | 1/1990 | Smith | 180/190 |
| 4,917,207 A | 4/1990 | Yasui et al. | |
| 4,958,584 A * | 9/1990 | Williamson | 440/12.52 |
| 4,981,188 A | 1/1991 | Kadela | |
| 5,014,805 A | 5/1991 | Uchida | |
| 5,064,208 A | 11/1991 | Bibollet | |
| D333,110 S | 2/1993 | Mogi et al. | |
| 5,228,528 A | 7/1993 | Sauve | |
| 5,400,734 A * | 3/1995 | Doyon | 440/12.51 |
| 5,467,839 A | 11/1995 | Yoshio | |
| 5,474,146 A | 12/1995 | Yoshioka et al. | |
| 5,533,586 A | 7/1996 | Thompson | |
| 5,568,840 A | 10/1996 | Nagata et al. | |
| 5,586,614 A | 12/1996 | Kouchi et al. | |
| 5,667,031 A | 9/1997 | Karpik | |
| 5,692,579 A | 12/1997 | Peppel et al. | |
| D389,780 S | 1/1998 | Komatsu et al. | |
| 5,727,643 A | 3/1998 | Kawano et al. | |
| 5,829,545 A | 11/1998 | Yamamoto et al. | |
| 5,853,061 A | 12/1998 | Yamamoto et al. | |
| 5,881,834 A | 3/1999 | Karpik | |
| 5,904,216 A | 5/1999 | Furusawa | |
| 5,904,217 A | 5/1999 | Yamamoto et al. | |
| 5,944,134 A | 8/1999 | Peppel et al. | |
| 5,947,220 A | 9/1999 | Oka et al. | |
| 5,964,311 A | 10/1999 | Yamamoto et al. | |
| 5,975,161 A * | 11/1999 | Ridgley | 141/231 |
| 5,996,717 A | 12/1999 | Hisadomi | |
| 6,006,847 A | 12/1999 | Knight | |
| 6,024,183 A | 2/2000 | Dietz et al. | |
| 6,032,752 A | 3/2000 | Karpik et al. | |
| 6,032,754 A | 3/2000 | Izumi et al. | |
| 6,039,136 A | 3/2000 | Kanan | |
| 6,062,156 A * | 5/2000 | Radke et al. | 114/144 R |
| 6,070,683 A | 6/2000 | Izumi et al. | |
| 6,095,275 A | 8/2000 | Shaw | |
| 6,112,840 A | 9/2000 | Forbes | |
| 6,125,956 A | 10/2000 | Gignac | |
| 6,134,984 A | 10/2000 | Hisadomi | |
| 6,155,363 A | 12/2000 | Matsumoto et al. | |
| 6,170,589 B1 | 1/2001 | Kawano et al. | |
| 6,170,590 B1 | 1/2001 | Hisadomi | |
| 6,199,648 B1 | 3/2001 | Kanan | |
| 6,234,263 B1 | 5/2001 | Boivin et al. | |
| 6,237,706 B1 | 5/2001 | Karpik et al. | |
| 6,247,547 B1 | 6/2001 | Lemke et al. | |
| 6,263,991 B1 | 7/2001 | Savage et al. | |
| 6,267,458 B1 | 7/2001 | Hansen et al. | |
| 6,302,232 B1 | 10/2001 | Forbes | |
| 6,321,864 B1 | 11/2001 | Forbes | |
| 6,338,373 B1 | 1/2002 | Forbes et al. | |
| 6,340,177 B1 | 1/2002 | Granderson et al. | |
| 6,354,389 B1 | 3/2002 | Zaczkowski et al. | |
| 6,382,338 B1 | 5/2002 | Forbes | |
| 6,431,301 B1 | 8/2002 | Forbes | |
| 6,464,033 B2 | 10/2002 | Izumi et al. | |
| 6,482,052 B1 * | 11/2002 | Giljam | 440/12.51 |
| 6,502,651 B2 | 1/2003 | Zaczkowski et al. | |
| 6,505,694 B2 | 1/2003 | Maguire | |
| 6,505,896 B1 | 1/2003 | Boivin et al. | |
| 6,540,310 B1 * | 4/2003 | Cartwright | 305/180 |
| RE38,124 E | 5/2003 | Mallette et al. | |
| 6,595,812 B1 * | 7/2003 | Haney | 440/11 |
| 6,666,735 B2 * | 12/2003 | Benoit | 440/12.5 |
| 2001/0031680 A1 | 10/2001 | Schempf et al. | |
| 2001/0047894 A1 * | 12/2001 | Maguire | 180/9.38 |
| 2002/0088661 A1 | 7/2002 | Gagnon et al. | |
| 2002/0153186 A1 | 10/2002 | Lemieux | |
| 2002/0155765 A1 | 10/2002 | Morin | |

OTHER PUBLICATIONS

Booklet entitled ATV All-Terrain Vehicle A new concept for a go-anywhere vehicle by the Outboard marine Corporation, Waukegan, Illinois Date unknown.
Cushmantrackster.com/history.html, printed.
Cushmantrackster.com/home.html, printed.

* cited by examiner

TRACKED VEHICLE

RELATED APPLICATIONS

This application is related to and claims priority to U.S. provisional application No. 60/386,025, filed Jun. 4, 2002, and entitled, "Tracked Vehicle." The present application is also related to a U.S. patent application entitled "Suspension for a Tracked Vehicle" by the same inventor and filed on an even date herewith. The entire disclosure of the above-mentioned patent applications is hereby incorporated by reference.

FIELD OF THE INVENTION

The present invention relates generally to recreational vehicles. More particularly, the present invention relates to methods and apparatus for traversing challenging terrain with a recreational vehicle.

BACKGROUND OF THE INVENTION

In recent years, recreational vehicles have gained widespread popularity. Recreational vehicles are commonly used in hunting, trail riding and utility applications such as the wide variety of maintenance activities which take place on a farm. Attachments are available which allow recreational vehicles to be used for plowing snow, mowing grass, hauling material and other useful functions.

Perhaps the most common recreational vehicle application is trail riding. Trail riding on a recreational vehicle allows the rider to travel through areas which are not accessible by ordinary automobiles. Modem recreational vehicles, can cover ground very rapidly and can cover great distances. Frequently, recreational vehicle enthusiasts ride their recreational vehicle for many hours straight and cover many miles. If the rider is subjected to excessive jarring while traveling over rough terrain, operator fatigue may result particularly during a long ride. During such long rides, a recreational vehicle may be used to carry a rider through a wide variety of terrain. Terrain that may be encountered includes snow, sand, mud and swampland. Frequently recreational vehicles are called upon to travel across rugged terrain at relatively high speeds.

Part of the thrill of riding a recreational vehicle is encountering challenging terrain, and through the performance of the recreational vehicle and the skill of the rider passing through the terrain. It is not uncommon for recreational vehicle riders to seek out large mud holes and attempt to traverse these obstacles with a recreational vehicle. The depth of some of these mud holes is actually greater than the height of the recreational vehicle. When passing through an obstacle such as mud hole, the recreational vehicle may become immersed in water, mud, or a mixture thereof.

SUMMARY OF THE INVENTION

The present invention relates generally to recreational vehicles. More particularly, the present invention relates to methods and apparatus for traversing challenging terrain with a recreational vehicle. A vehicle in accordance with an exemplary embodiment of the present invention comprises a first drive track that is supported by a first rear suspension and a second drive track of vehicle is supported by a second rear suspension. The first drive track and the second drive track may be operatively coupled to an engine by a drive train for propelling the vehicle. In certain applications, the drive tracks provide a high degree of traction. The drive tracks may also be arranged to proved a relatively larger foot print which reduces the ground contract pressure of the vehicle.

In certain exemplary embodiments, the first drive track includes a plurality of first bars and the second drive track includes a plurality of second bars. The first bars of the first drive track having a first shape and the second bars of the second drive track having a second shape. In certain advantageous embodiments, the second shape is substantially a mirror image of the first shape. In some advantageous implementations, each bar has a generally arcuate shape with a concave side of each first bar facing a forward direction of the vehicle. The radius of the bars may be selected for facilitating turning of the vehicle by allowing for lateral slippage of the first drive track and the second drive track thereby reducing potential damage to turf and/or terrian under the first drive track and the second drive track.

In some exemplary configurations, the vehicle provides for side-by-side seating of two or more riders. In other configurations the vehicle provides for tandem (i.e., front to back) seating of two or more riders.

In some useful implementations, the vehicle includes a first actuator for varying the characteristics of the first rear suspension (e.g., the spring rate) and a second actuator for varying the characteristics of the second rear suspension. In one exemplary embodiment, the first actuator comprises a first motor and the second actuator comprises a second motor. In this exemplary embodiment, the first motor and the second motor are both electrically coupled to a controller. A first encoder and a second encoder are also electrically coupled to the controller. In certain advantageous embodiments of the present invention, the controller is adapted to coordinate the motion of the left actuator and the right actuator. In these advantageous embodiments, the controller provides an easy way to adjust the suspension characteristics of the vehicle. For example, when hauling heavy loads, it may be desirable to stiffen the rear suspension. Also in these advantageous embodiments, the controller assures that the stiffness of the first rear suspension will match the stiffness of the second rear suspension.

A vehicle in accordance with an additional exemplary embodiment of the present invention comprises a chassis and a shell attached to the chassis. A pair of front wheels are coupled to the chassis by a front suspension. When the vehicle is partially or completely immersed in a fluid, the front wheels and the shell provide buoyancy to the vehicle. In one aspect of the present invention, the buoyancy force provided by the front wheels acts on a front portion of the vehicle and the buoyancy force provided by the shell acts on a rear portion of the vehicle. In certain advantageous implementations, the shell is positioned and dimensioned so that these buoyancy forces are balanced about a centroid of the vehicle.

DETAILED DESCRIPTION

The following detailed description should be read with reference to the drawings, in which like elements in different drawings are numbered identically. The drawings, which are not necessarily to scale, depict selected embodiments and are not intended to limit the scope of the invention. Examples of constructions, materials, dimensions, and manufacturing processes are provided for selected elements. All other elements employ that which is known to those of skill in the field of the invention. Those skilled in the art will recognize that many of the examples provided have suitable alternatives that can be utilized.

Figure 1:
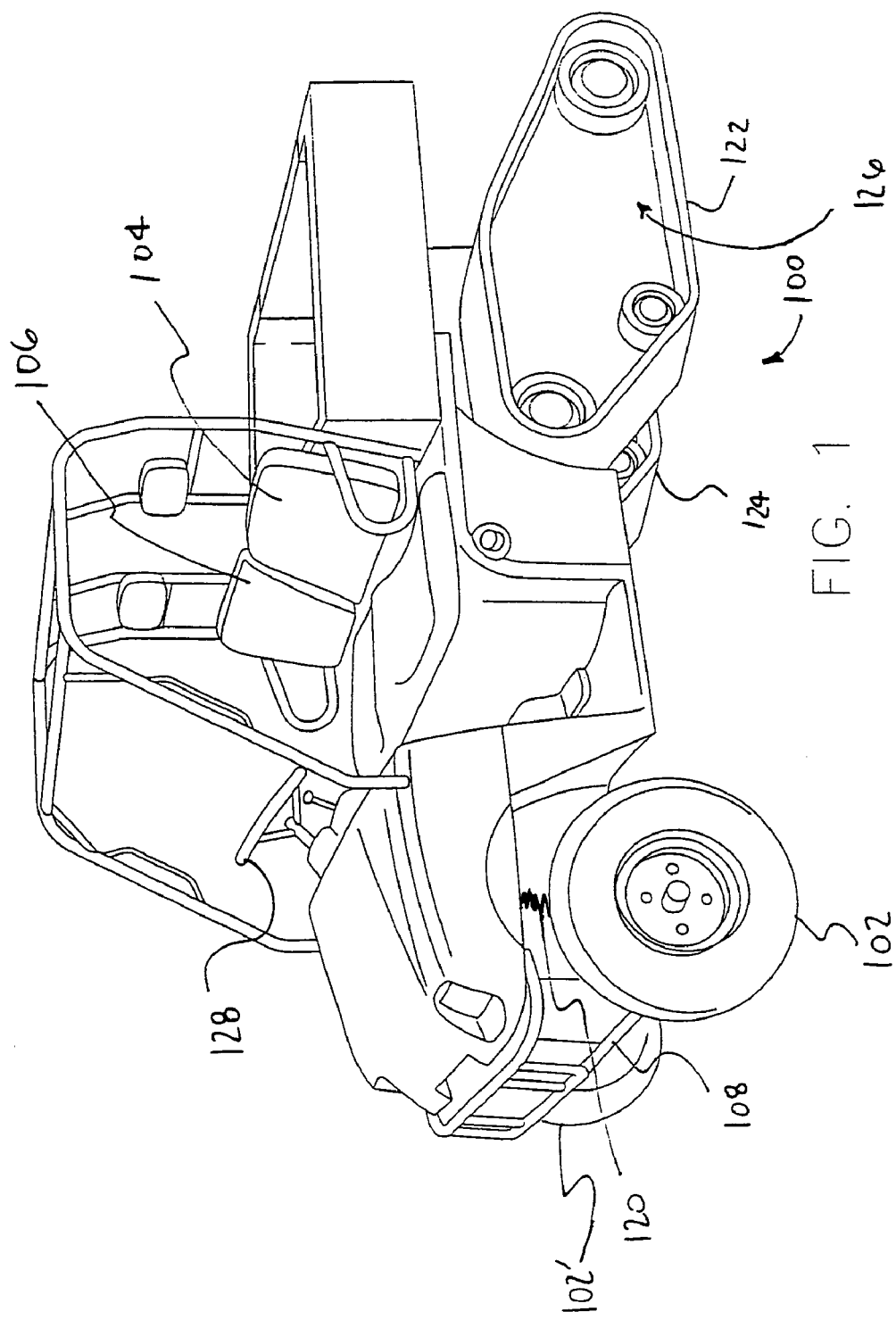
FIG. 1 is an isometric view of a vehicle having a first seat and a second seat.

FIG. 1 is an isometric view of a vehicle 100 having a first seat 104 and a second seat 106. In the embodiment of FIG. 1, first seat 104 and second seat 106 are positioned and dimensioned so as to accommodate two persons sitting in side-by-side fashion. Vehicle 100 of FIG. 1 includes a front wheel 102 that is connected to a chassis 108 of vehicle 100 by a front suspension 120. Vehicle 100 also includes a first drive track 122 and a second drive track 124. In the embodiment of FIG. 1, first drive track 122 comprises an endless loop that is supported by a first rear suspension 126. First drive track 122 may be operatively coupled to an engine by a drive train for propelling vehicle 100. A second drive track 124 of vehicle 100 is also visible in FIG. 1. Vehicle 100 also includes a second front wheel 102" and a steering wheel 128. Steering wheel 128 may advantageously be used for steering first front wheel 102 and second front wheel 102".

Figure 2:
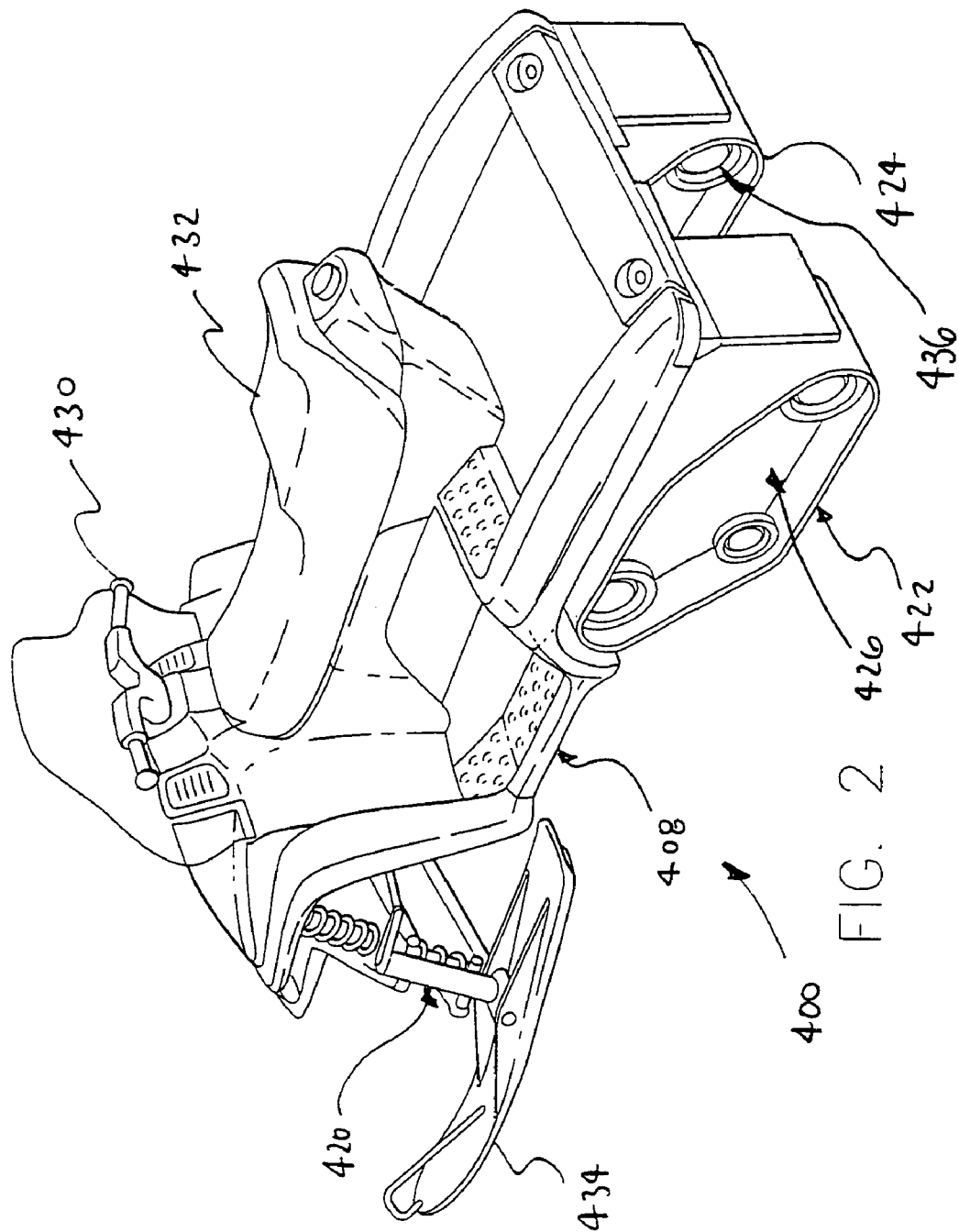
FIG. 2 is an isometric view of a vehicle comprising a handlebar and a seat.

FIG. 2 is an isometric view of a vehicle 400 comprising a handlebar 430 and a seat 432. In the embodiment of FIG. 2, seat 432 shaped to receive two riders in tandem. Vehicle 400 of FIG. 2 includes a front ski 434 that is connected to a chassis 408 of vehicle 400 by a front suspension 420. Vehicle 400 also includes a first drive track 422 that is supported by a first rear suspension 426. A second drive track 424 of vehicle 400 is supported by a second rear suspension 436. First drive track 422 and second drive track 424 may be operatively coupled to an engine by a drive train for propelling vehicle 400.

Figure 3:
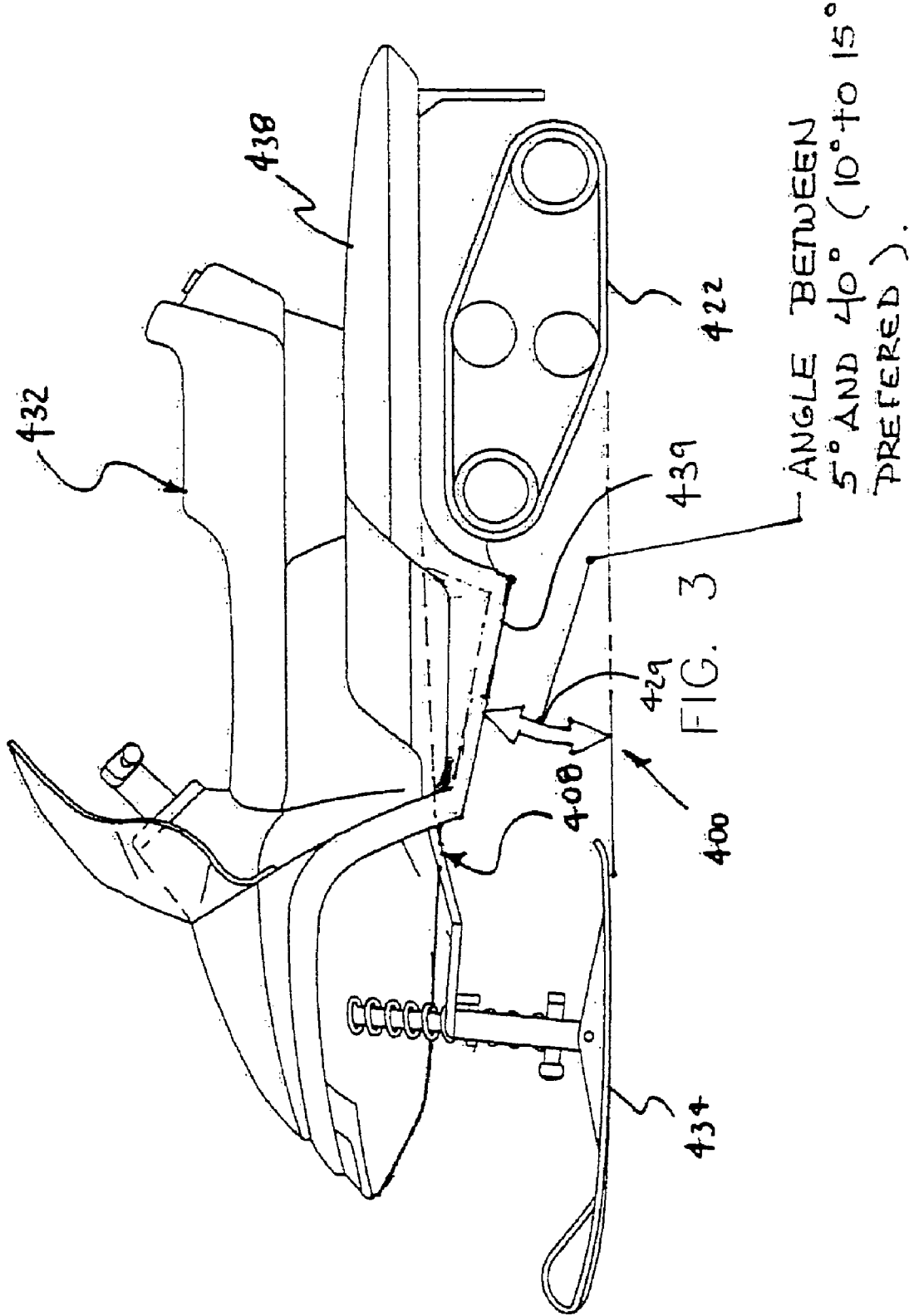
FIG. 3 is a side view of a vehicle in accordance with an additional exemplary embodiment of the present invention.

FIG. 3 is a side view of a vehicle 400 in accordance with an additional exemplary embodiment of the present invention. First drive track 422 and front ski 434 are visible in FIG. 3. Vehicle 400 of FIG. 3 also includes a seat 432. In the embodiment of FIG. 3, a front portion of seat 432 is positioned and dimensioned to receive a first rider and a rear portion of seat 432 is dimensioned in positioned to receive a second rider. Vehicle 400 also includes a shell 438 that is fixed to a chassis 408 of vehicle 400.

In the embodiment of FIG. 3, a forward portion of shell 438 defines a ramp 439 that is disposed generally in front of first drive track 422. Ramp 439 may be positioned and dimension so as to pack down terrain (e.g., snow) before that terrain is traversed by drive track 422. Ski 434 of vehicle 400 may also be positioned so as to pack down terrain before it is encountered by drive track 422. In FIG. 3, ramp 439 is shown defining a ramp angle 429 with a horizontal reference plane. In some useful embodiments of the present invention, ramp angle 429 is between about 5 degrees and about 40 degrees. In some particularly useful embodiments of the present invention, ramp angle 429 is between about 10 degrees and about 15 degrees.

Figure 4:
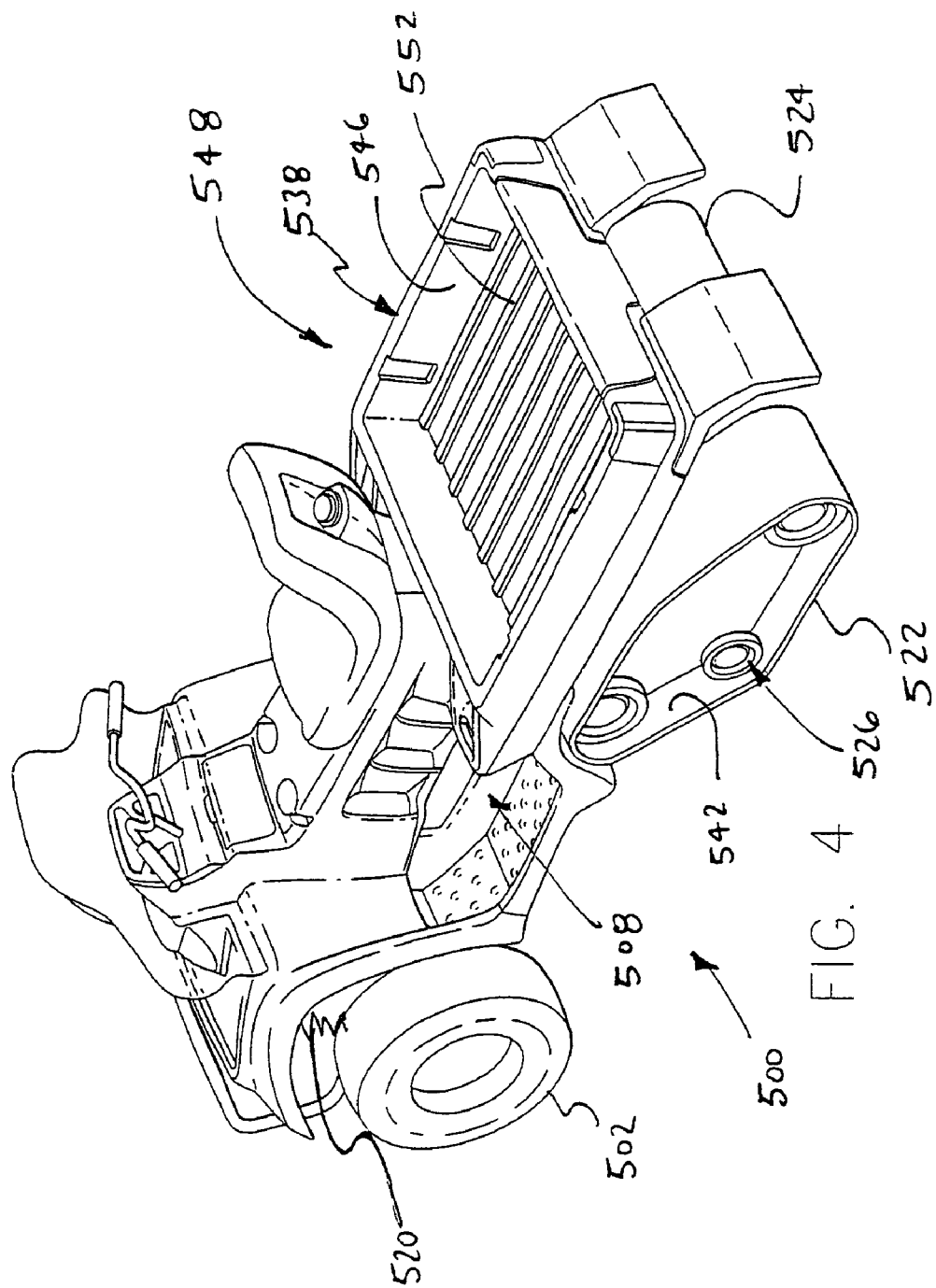
FIG. 4 is an isometric view of a vehicle comprising a front wheel that is supported by a front suspension.

FIG. 4 is an isometric view of a vehicle 500 comprising a front wheel 502 that is supported by a front suspension 520. Vehicle 500 also comprises a first drive track 522 and a second drive track 524. In FIG. 4, a first rear suspension 526 of vehicle 500 can be seen disposed within an interior defined by an inner surface 542 of first drive track 522. In the embodiment of FIG. 4 first drive track 522 comprises an endless loop that is supported by a first rear suspension 526. First drive track 522 and second drive track 524 may be operatively coupled to an engine by a drive train for propelling vehicle 500. In the embodiment of FIG. 4, vehicle 500 includes a shell 538 that is preferably fixed to chassis 508 of vehicle 500. In the embodiment of FIG. 4, an outer surface 546 of shell 538 forms a carrier 548 including a cargo carrying surface 552.

Figure 5:
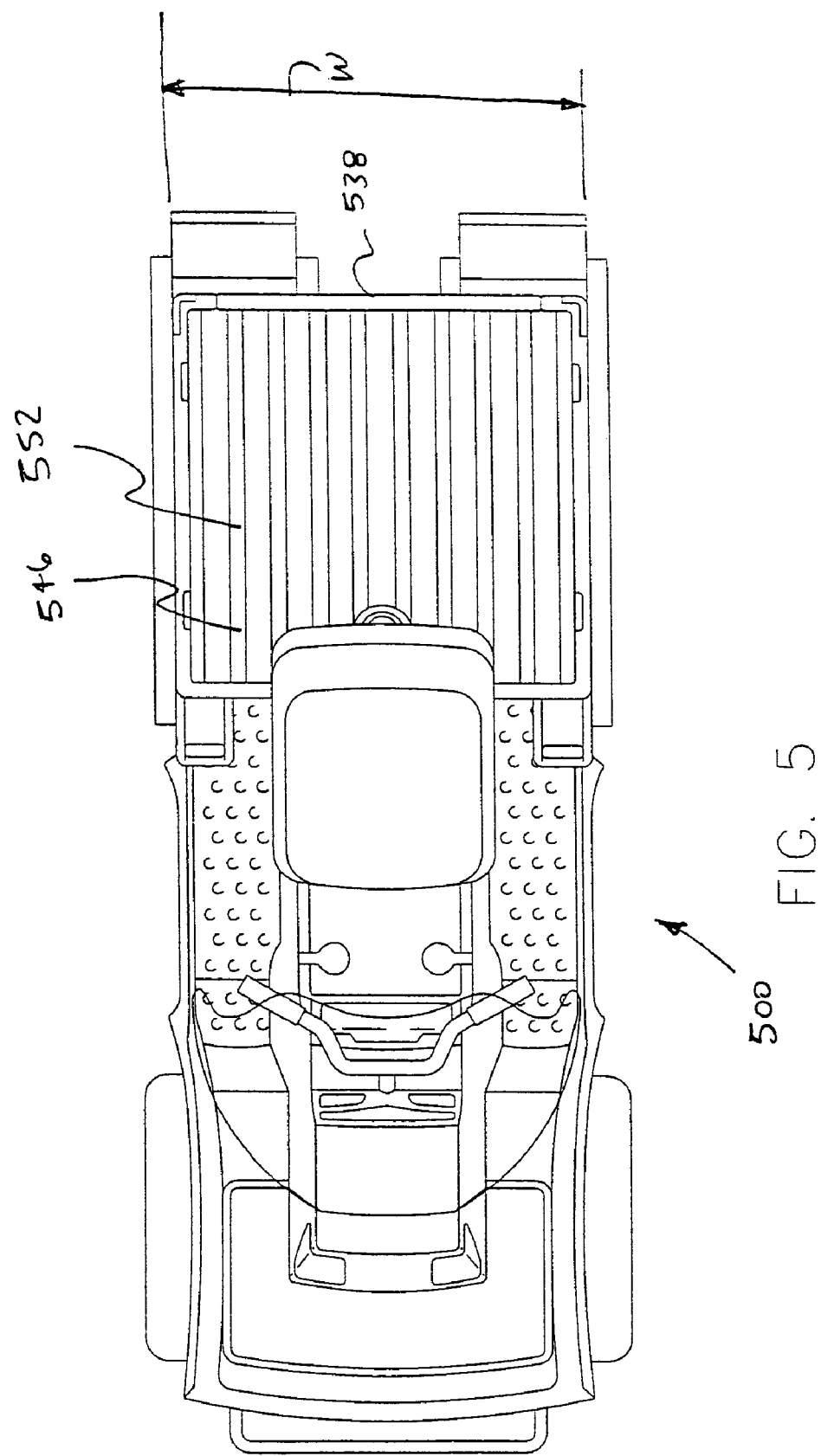
FIG. 5 is a top view of vehicle shown in the previous figure.

FIG. 5 is a top view of vehicle 500 shown in the previous figure. In FIG. 5, it may be appreciated that shell 538 extends substantially across a width W of vehicle 500. Cargo carrying surface 552 defined by outer surface 546 of shell 538 is also visible in FIG. 5.

Figure 6:
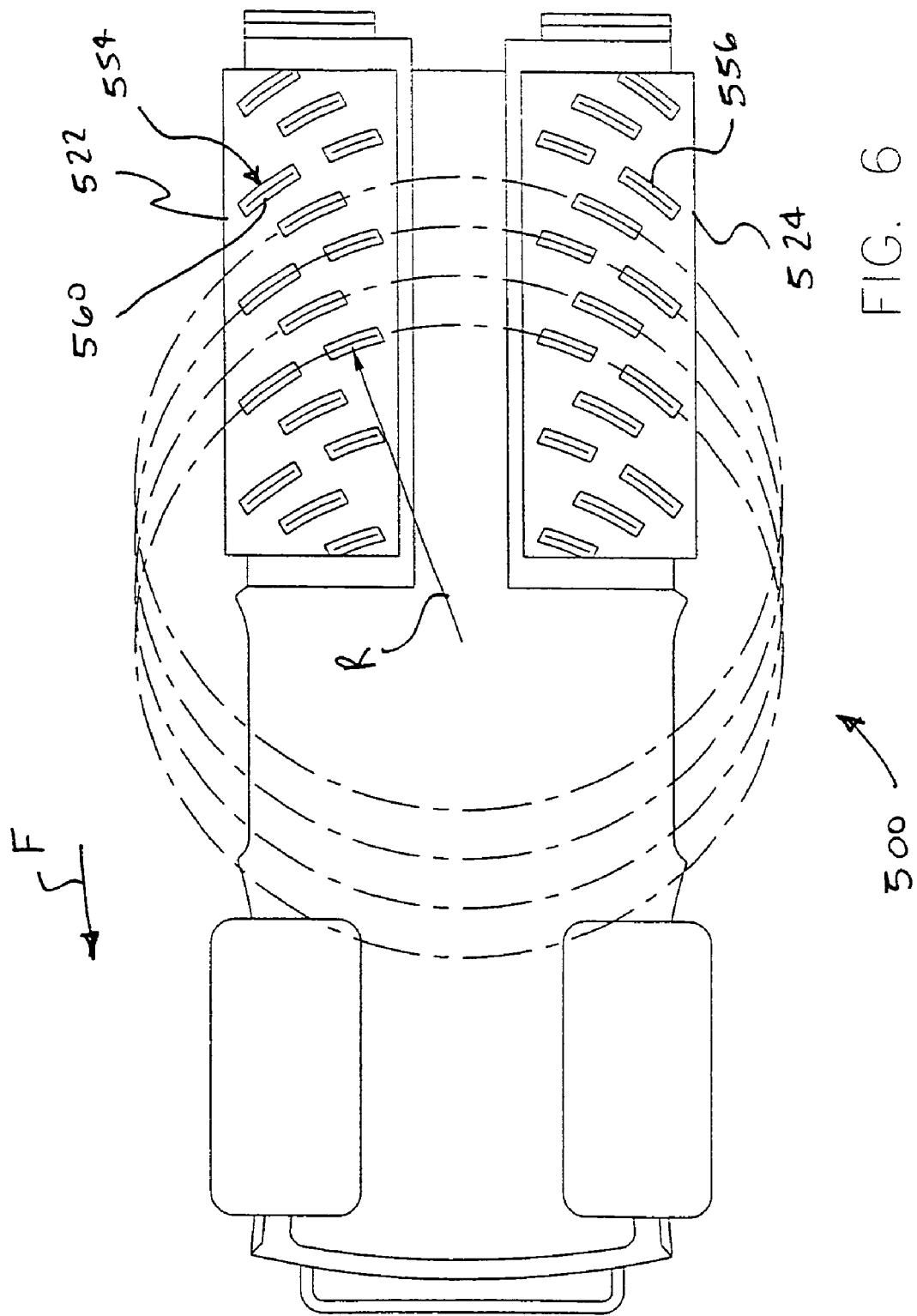
FIG. 6 is a bottom view of vehicle shown in the previous figure.

FIG. 6 is a bottom view of vehicle 500 shown in the previous figure. In FIG. 6, it may be appreciated that first drive track 522 includes a plurality of first bars 554 and second drive track 524 includes a plurality of second bars 556. First bars 554 of first drive track 522 have a first shape and second bars 556 of second drive track 524 have a second shape. In the embodiment of FIG. 6, the second shape is substantially a mirror image of the first shape.

In FIG. 6, it may be appreciated that each first bar 554 has a generally arcuate shape with a concave side 560 of each first bar facing a forward direction F. Additionally, each second bar 556 has a generally arcuate shape with a concave side 560 of each first bar facing a forward direction F. In the embodiment of FIG. 6, each bar has a radius R. The shape and position of first bars 554 and second bars 556 may facilitate turning of vehicle 500 by allowing for lateral slippage of first drive track 522 and second drive track 524.

Figure 7:
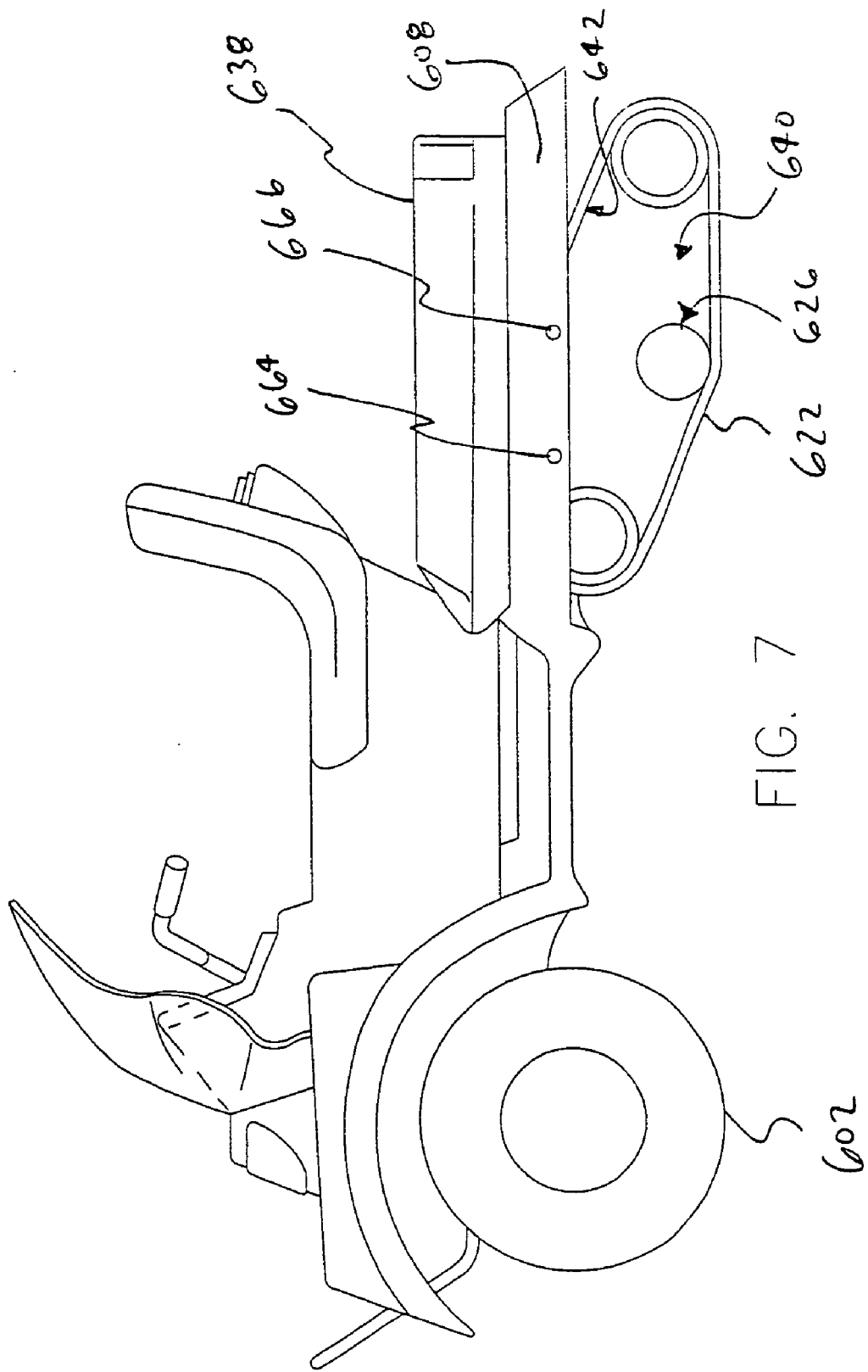
FIG. 7 is a side view of a vehicle comprising a front wheel and a first drive track.

FIG. 7 is a side view of a vehicle 600 comprising a front wheel 602 and a first drive track 622. In FIG. 7, a first rear suspension 626 of vehicle 600 can be seen disposed within an interior 640 defined by an inner surface 642 of first drive track 622. In the embodiment of FIG. 7, first rear suspension 626 is attached to a chassis 608 by a first front fastener 664 and a first rear fastener 666. In the embodiment of FIG. 7, vehicle 600 includes a shell 638 that is preferably fixed to chassis 608 of vehicle 600.

Figure 8:
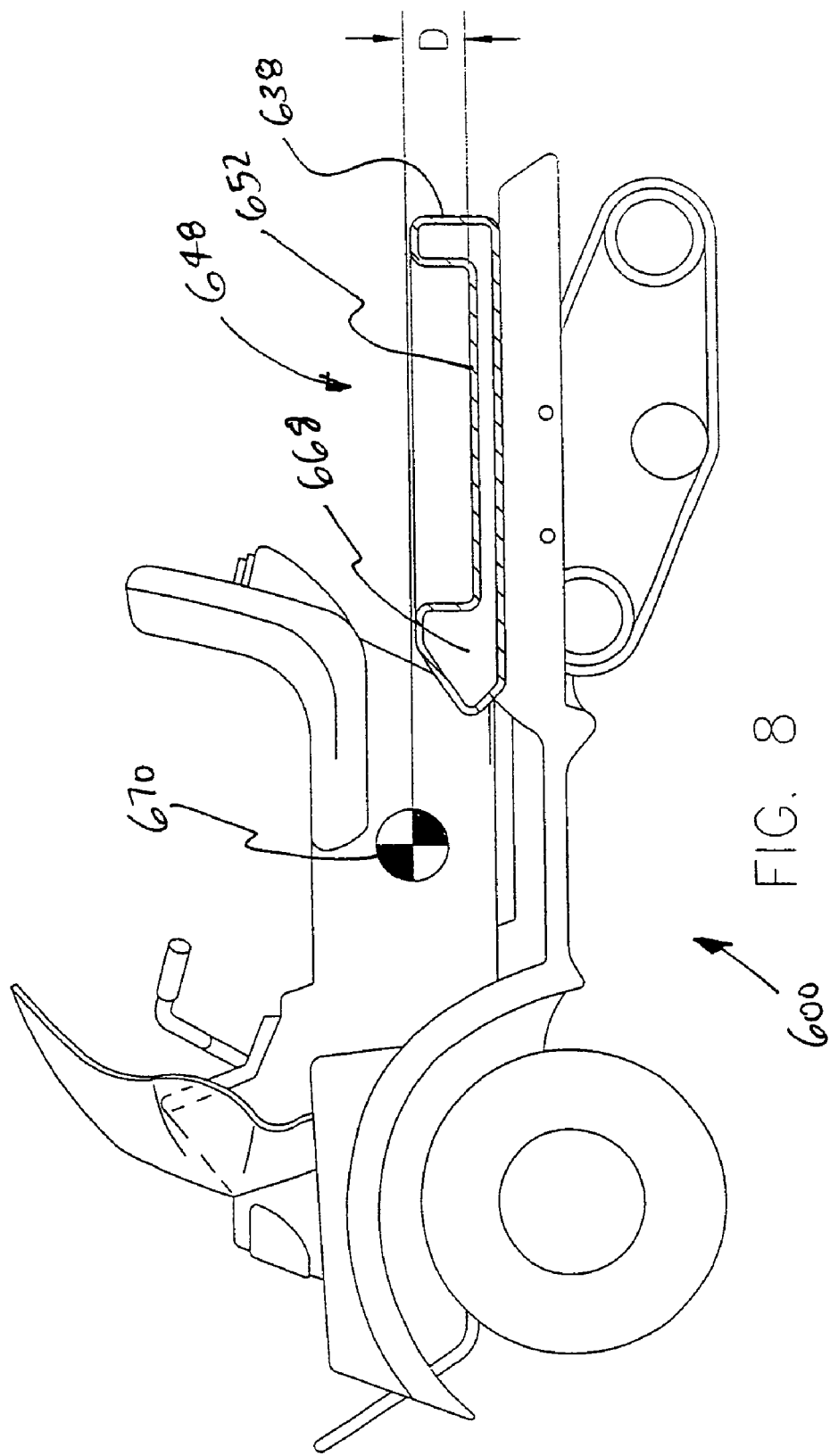
FIG. 8 is an additional side view illustrating vehicle shown in the previous figure.

FIG. 8 is an additional side view illustrating vehicle 600 shown in the previous figure. Shell 638 is shown in cross section in FIG. 8. In the embodiment of FIG. 8, it may be appreciated that an inner surface of shell 638 defines a cavity 668. Also in FIG. 8, it may be appreciated that an outer surface 646 of shell 638 defines a carrier 648 including a cargo carrying surface 652. With reference to FIG. 8, it may be appreciated that cargo carrying surface 652 is disposed below a centroid 670 of vehicle 600 by a distance D. In certain applications, placing cargo carrying surface 652 in a relatively low location prevents cargo resting on cargo carrying surface 652 from unduly raising a combined (i.e., cargo plus vehicle) center of gravity.

Figure 9:
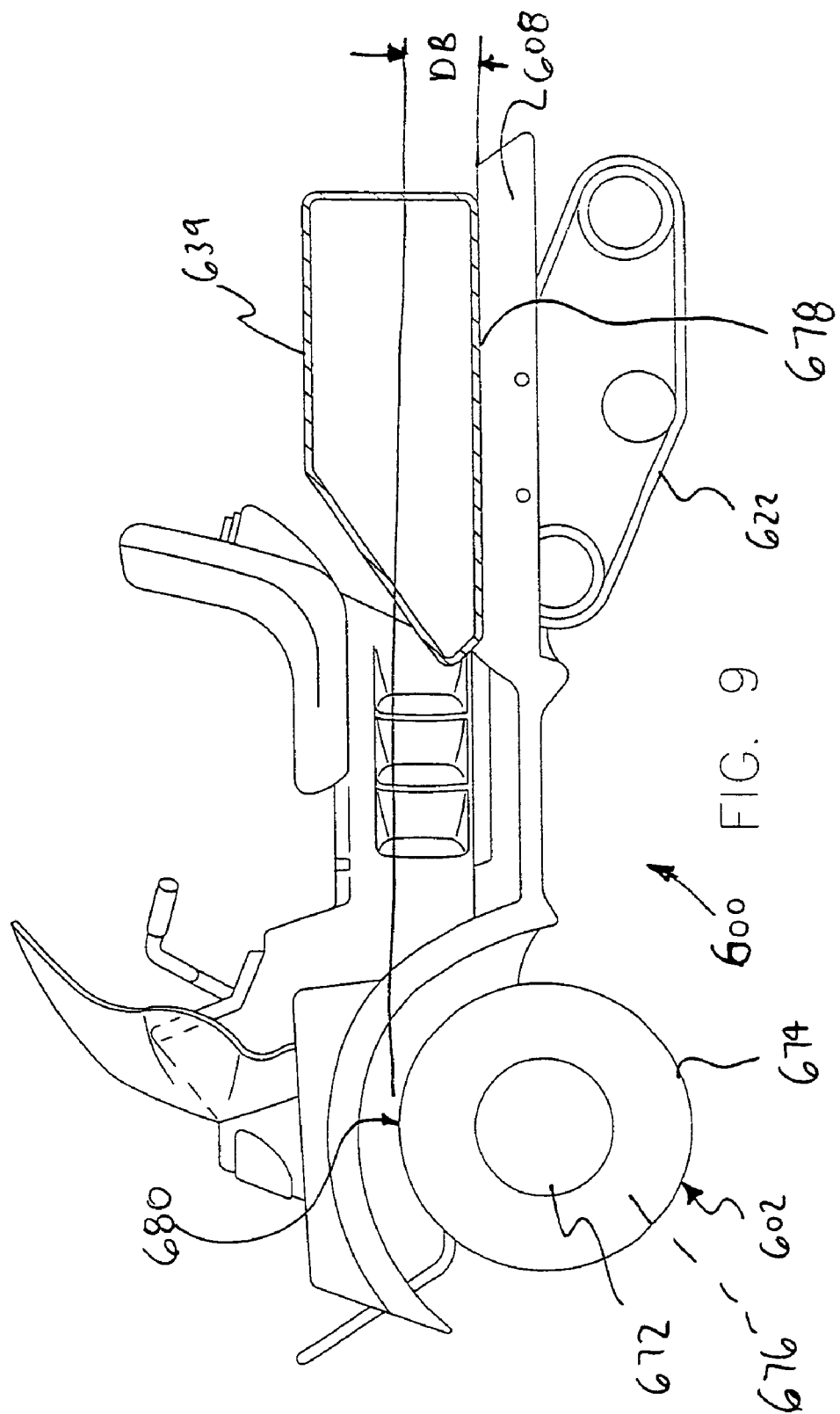
FIG. 9 is a side view illustrating of a vehicle in accordance with an additional exemplary embodiment of the present invention.

FIG. 9 is a side view illustrating of a vehicle 600 in accordance with an additional exemplary embodiment of the present invention. Vehicle 600 of FIG. 9 includes a shell 639 that is fixed preferably fixed to a chassis 608 of vehicle 600. Shell 639 is shown in cross section in FIG. 9 for purposes of illustration. Vehicle 600 also includes a first front wheel 602 and a first drive track 622. In the embodiment of FIG. 9, first front wheel 602 comprises a rim 672 and a tire 674. Tire 674 defines an enclosed space 676. In FIG. 9 it may be appreciated that a lowermost surface 678 of shell 639 is disposed below an uppermost surface 680 of first front wheel 602 by a distance DB.

Figure 10:
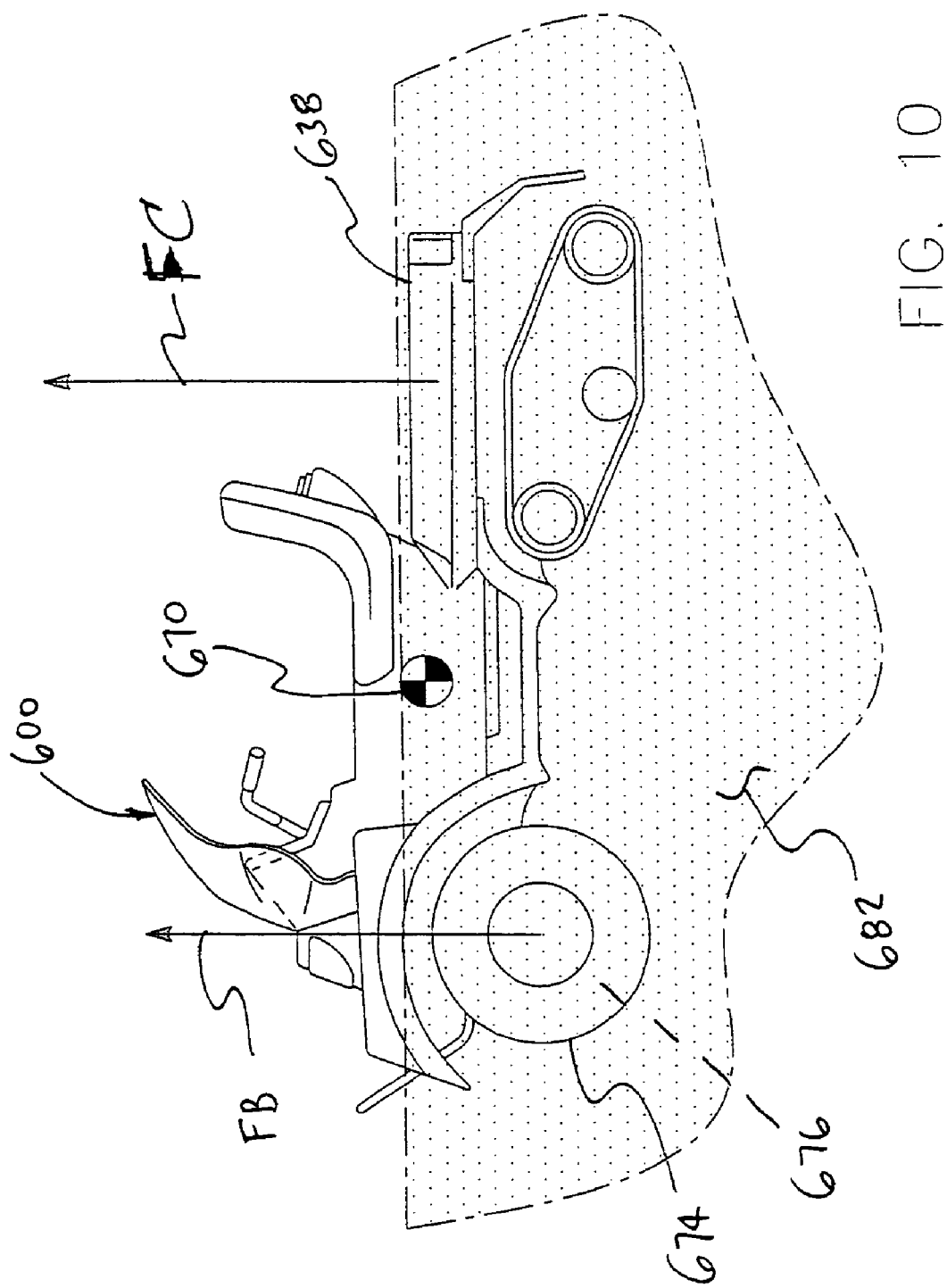
FIG. 10 is a side view illustrating a vehicle that is partially immersed in a fluid.

FIG. 10 is a side view illustrating a vehicle 600 that is partially immersed in a fluid 682. A first buoyancy force FB is illustrated with an arrow in FIG. 10. In some advantageous embodiments of the present invention, first buoyancy force FB is due to the enclosed space 676 of a first front tire 674 and the enclosed space of a second front tire. A second buoyancy force FC is also illustrated with an arrow in FIG. 10. As described above, a vehicle in accordance with certain advantageous embodiments of the present invention includes a shell defining a cavity filled with air. In the embodiment of FIG. 10, shell 638 produces buoyancy force FC when it is at least partially immersed in fluid 682. With reference to FIG. 10, it will be appreciated that first buoyancy force FB is disposed on a front side of a centroid 670 of vehicle 600 and second buoyancy force FC is disposed on a rearward side of centroid 670.

Figure 11:
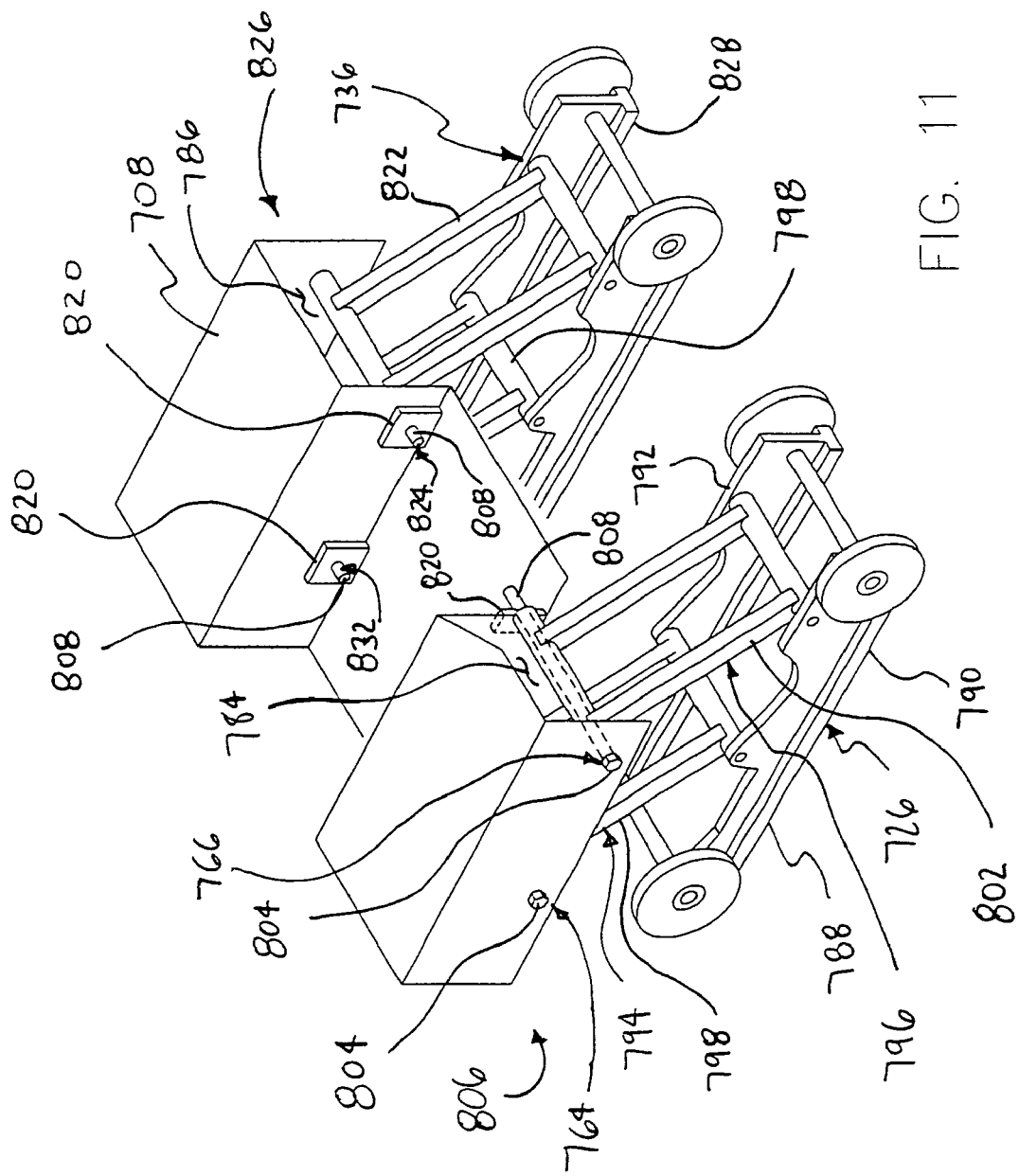
FIG. 11 is an isometric view of an assembly in accordance with an exemplary embodiment of the present invention.

FIG. 11 is an isometric view of an assembly in accordance with an exemplary embodiment of the present invention. The assembly of FIG. 11 includes a cut-away portion of a vehicle chassis 708 defining a first tunnel 784 and a second tunnel 786. In FIG. 11, it may be appreciated that first tunnel 784 and second tunnel 786 are dimensioned to receive a first rear suspension 726 and a second rear suspension 736 respectively.

In the embodiment of FIG. 11, first rear suspension 726 comprises a first slide frame 788 including a first slide 790 and a second slide 792. In the embodiment of FIG. 11, first rear suspension also comprises a first front suspension mechanism 794 and a first rear suspension mechanism 796. As shown in FIG. 11, first front suspension mechanism 794 includes a first front suspension arm 798 that is pivotally connected to first slide frame 788. Also as shown in FIG. 11, first rear suspension mechanism 726 includes a first rear suspension arm 802 that is pivotally connected to first slide frame 788. In the embodiment of FIG. 11, first rear suspension arm 802 is pivotally connected to chassis 708 by a first rear fastener 766. First rear fastener 766 comprises a head 804 that is accessible from a first side 806 of chassis 708. First rear fastener 766 also comprises a shaft 808 that threadingly engages a female threaded member 820. In some advantageous embodiments of the present invention, female threaded member 820 is fixed to chassis 708. Various methods may be used to fix female threaded member 820 without deviating from the spirit and scope of the present invention. For example, female threaded member 820 may be fixed to chassis 708 using screws or rivets. A second rear suspension arm 822 of second rear suspension 736 is pivotally connected to chassis 708 by a second rear fastener 824. Second rear fastener 824 comprises a head (not visible in FIG. 11) that is accessible from a second side 826 of chassis 708. Second rear fastener also comprises a shaft 808 that threadingly engages a female threaded member 820.

Second rear suspension 736 also comprises a second front suspension arm 798 that is pivotally connected to a second slide frame 828. In the embodiment of FIG. 11, second front suspension arm 830 is pivotally connected to chassis 708 by a second front fastener 832. Second front fastener 832 comprises a head (not visible in FIG. 11) that is accessible from a second side 826 of chassis 708. Second front fastener 832 also comprises a shaft 808 that threadingly engages a female threaded member 820. First front suspension arm 798 of first front suspension 794 is pivotally connected to chassis 708 by a first front fastener 764. First front fastener 764 comprises a head 804 that is accessible from a first side 806 of chassis 708. First front fastener also comprises a shaft (not visible in FIG. 11) that threadingly engages a female threaded member.

Figure 12:
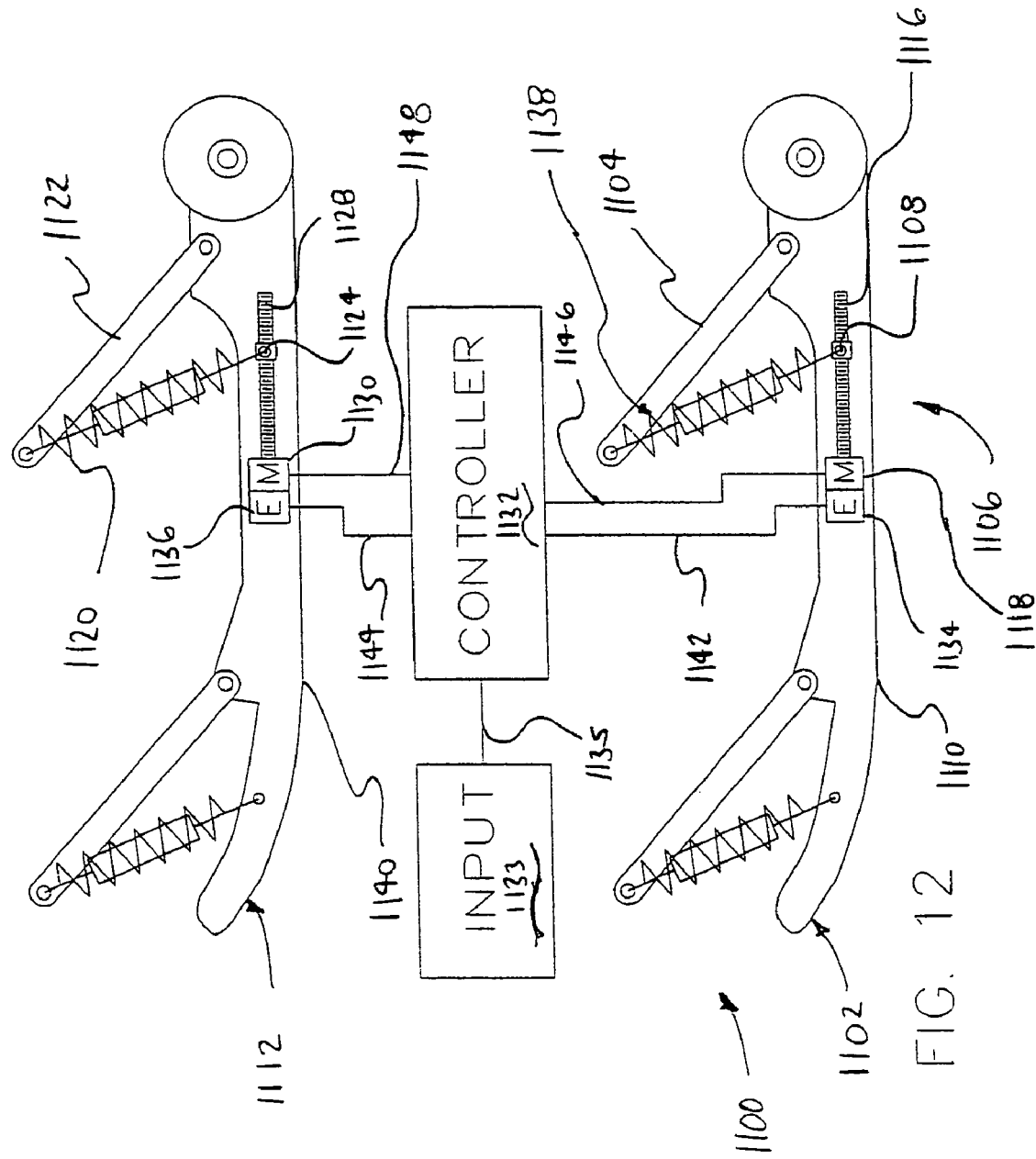
FIG. 12 is a diagrammatic representation of a suspension system in accordance with an exemplary embodiment of the present invention.

In an advantageous method in accordance with the present invention, first rear suspension 726 may be disconnected from chassis 708 by removing first front fastener 764 and first rear fastener 766. With reference to FIG. 11, it will be appreciated that first front fastener 764 and first rear fastener 766 can both be removed from first side 806 of chassis 708. Similarly, second rear suspension 736 may be disconnected from chassis 708 by removing second front fastener 832 and second rear fastener 824. In the embodiment of FIG. 11, second front fastener 832 and second rear fastener 824 can both be removed from second side 826 of chassis 708. Accordingly, a vehicle in accordance with the present invention may provide for ease of maintenance FIG. 12 is a diagrammatic representation of a suspension system 1100 in accordance with an exemplary embodiment of the present invention. Suspension system 1100 comprises a first suspension 1102 and a second suspension 1112. First suspension 1102 comprises a first arm 1104 that is pivotally coupled to a first slide frame 1110. First suspension 1102 also comprises a first spring assembly 1138. In the embodiment of FIG. 12, a proximal end of first spring assembly is pivotally coupled to first arm 1104. A distal end of first spring assembly is pivotally couple to a first actuator 1106 at a first pivot point 1108. It is to be appreciated that first actuator 1106 may comprise various elements without deviating from the spirit and scope of the present invention. In the embodiment of FIG. 12, first actuator 1106 comprises a first lead screw 1116 and a first motor 1118.

Second suspension 1112 comprises a second arm 1122 that is pivotally coupled to a second slide frame 1140. Second suspension 1112 also comprises a second spring assembly 1120. In the embodiment of FIG. 12, a proximal end of second spring assembly 1120 is pivotally coupled to second arm 1122. A distal end of second spring assembly is pivotally couple to a second actuator 1126 at a second pivot point 1124. It is to be appreciated that second actuator 1126 may comprise various elements without deviating from the spirit and scope of the present invention. In the embodiment of FIG. 12, second actuator 1126 comprises a second lead screw 1128 and a second motor 1130.

In the embodiment of FIG. 12, first motor 1118 and second motor 1130 are both electrically coupled to a controller 1132. A first encoder 1134 and a second encoder 1136 are also electrically coupled to controller 1132. In certain advantageous embodiments of the present invention, controller 1132 is configured to receive a first position signal 1142 from first encoder 1134 and a second position signal 1144 from second encoder 1136. Also in certain advantageous embodiments, controller 1132 includes a means for comparing first position signal 1142 and second position signal 1144.

Controller 1132 may be advantageously configured to provide a first control signal 1146 and to first motor 1118 and a second control signal 1148 to second motor 1130. In some advantageous embodiments of the present invention, first control signal 1146 and second control signal 1148 are responsive to the comparison of first position signal 1142 and second position signal 1144. In certain advantageous embodiments of the present invention, controller 1132 is adapted to coordinate the motion of a left actuator and a right actuator. In these advantageous embodiments, the controller provides an easy way to adjust the suspension characteristics (e.g., spring rate) of the vehicle. For example, when hauling heavy loads, it may be desirable to stiffen the rear suspension. Also in these advantageous embodiments, the controller assures that the stiffness of the first rear suspension will match the stiffness of the second rear suspension.

In FIG. 12, an input device 1133 is shown connected to controller 1132. Input device 1133 may be configure to provide an input signal 1135 to controller 1132. It is to be understood that input device 1133 may comprise various elements without deviating from the spirit and scope of the present invention. Input device 1133 may comprise, for example, an input switch.

Figure 13:
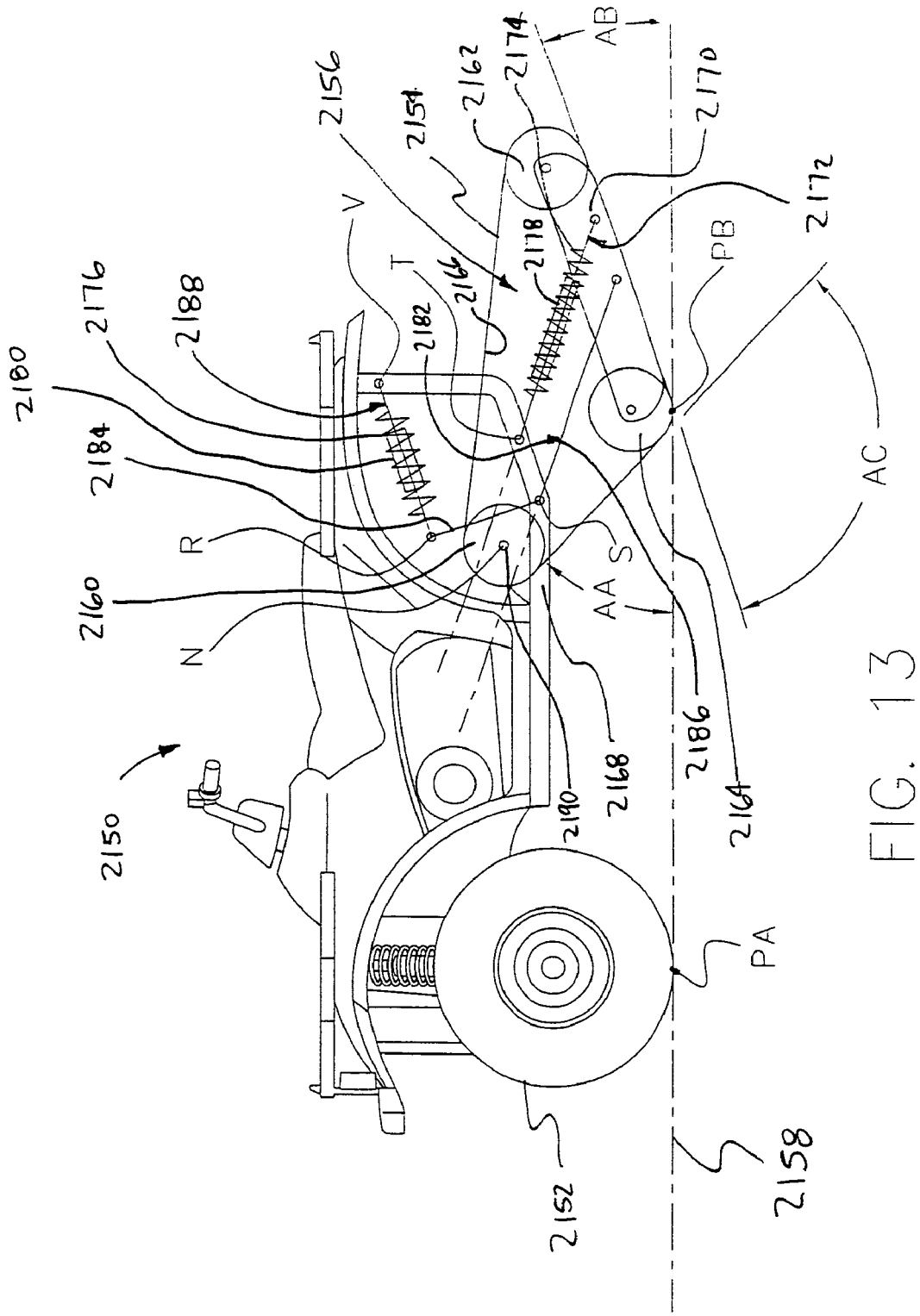
FIG. 13 is a side view illustrating of a vehicle in accordance with an additional exemplary embodiment of the present invention.

FIG. 13 is a side view illustrating of a vehicle 2150 in accordance with an additional exemplary embodiment of the present invention. Vehicle 2150 comprises a first front wheel 2152 and a first drive track 2154 that is supported by a first rear suspension 2156. A momentary contact point PA of first front wheel and a momentary contact point PB of first drive track 2154 define a ground contact plane 2158 of vehicle 2150.

With reference to FIG. 13, it will be appreciated that first drive track 2154 is disposed about a drive sprocket 2160, an upper idler wheel 2162 and a lower idler wheel 2164 such that first drive track 2154 assumes a generally triangular shape. An inner surface 2166 of first drive track 2154 and ground contact plane 2158 of vehicle 2150 define a leading angle AA. Also with reference to FIG. 13, it will be appreciated that inner surface 2166 of first drive track 2154 and ground contact plane 2158 of vehicle 2150 define a trailing angle AB. A lower track angle Ax is also illustrated in FIG. 13. As shown in FIG. 13, lower track angle AC is defined by inner surface 2166 of first drive track 2154.

In some advantageous embodiments of the present invention, first drive track 2154 assumes a first shape when first rear suspension 2156 is in a reference state and a second shape when first rear suspension 2156 is deflected. In the embodiment of FIG. 13, first rear suspension 2156 is shown in a reference state. Various reference states are possible without deviating from the spirit and scope of the present invention. For example, one reference state may be found when vehicle 2150 is at rest and the weight of vehicle 2150 is supported at least in part by first rear suspension 2156. Another example of a reference state may be found when vehicle 2150 is at rest and the weight of both a rider and vehicle 2150 are supported at least in part by first rear suspension 2156.

In the embodiment of FIG. 13, first drive track 2154 is supported by a drive sprocket 2160, an upper idler wheel 2162 and a lower idler wheel 2164. In the embodiment of FIG. 13, drive sprocket 2160 is rotatably supported by a chassis 2168 of vehicle 2150. In the embodiment of FIG. 13, upper idler wheel 2162 and lower idler wheel 2164 are rotatably supported by a slide frame 2170 of first rear suspension 2156. In FIG. 13, lower idler wheel 2164 is shown extending below upper idler wheel 2162.

In the embodiment of FIG. 13, first rear suspension 2156 comprises a strut 2172 that is pivotally coupled to chassis 2168 of vehicle 2150 at a pivot axis T. In the embodiment of FIG. 13, strut 2172 comprises a coil spring 2174 and a damper 2178. First rear suspension 2156 also includes a suspension arm 2182 comprising a first leg 2184 and a second leg 2186. A proximal portion of second leg 2186 is pivotally coupled to chassis 2168 of vehicle 2150 at a pivot axis S.

First rear suspension 2156 of FIG. 13 also includes a spring assembly 2188. One end of spring assembly 2188 is pivotally coupled to a distal portion of first leg 2184 of suspension arm 2182 at a pivot axis R. Another end of spring assembly 2188 is pivotally coupled to chassis 2168 of vehicle 2150 at a pivot axis V. In the embodiment of FIG. 13, spring assembly 2188 comprises a shock absorber 2180 and a spring 2176 disposed about shock absorber 2180.

Drive sprocket 2160 is shown disposed about a drive shaft 2190. In the embodiment of FIG. 13, drive sprocket 2160 and drive shaft 2190 both rotate about a rotational axis N. In FIG. 13, a longitudinal axis of second leg 2186 of suspension arm 2182 is shown extending below rotational axis N. Also in FIG. 13, a longitudinal axis of strut 2172 can be seen extending above rotational axis N. In some advantageous embodiments of the present invention, the longitudinal axis of second leg 2186 of suspension arm 2182 extends below rotational axis N and the longitudinal axis of strut 2172 extends above rotational axis N when the first rear suspension is in a fully compressed state. Also in some advantageous embodiments of the present invention, the longitudinal axis of second leg 2186 of suspension arm 2182 extends below rotational axis N and the longitudinal axis of strut 2172 extends above rotational axis N when the first rear suspension is in a fully extended state.

Figure 14:
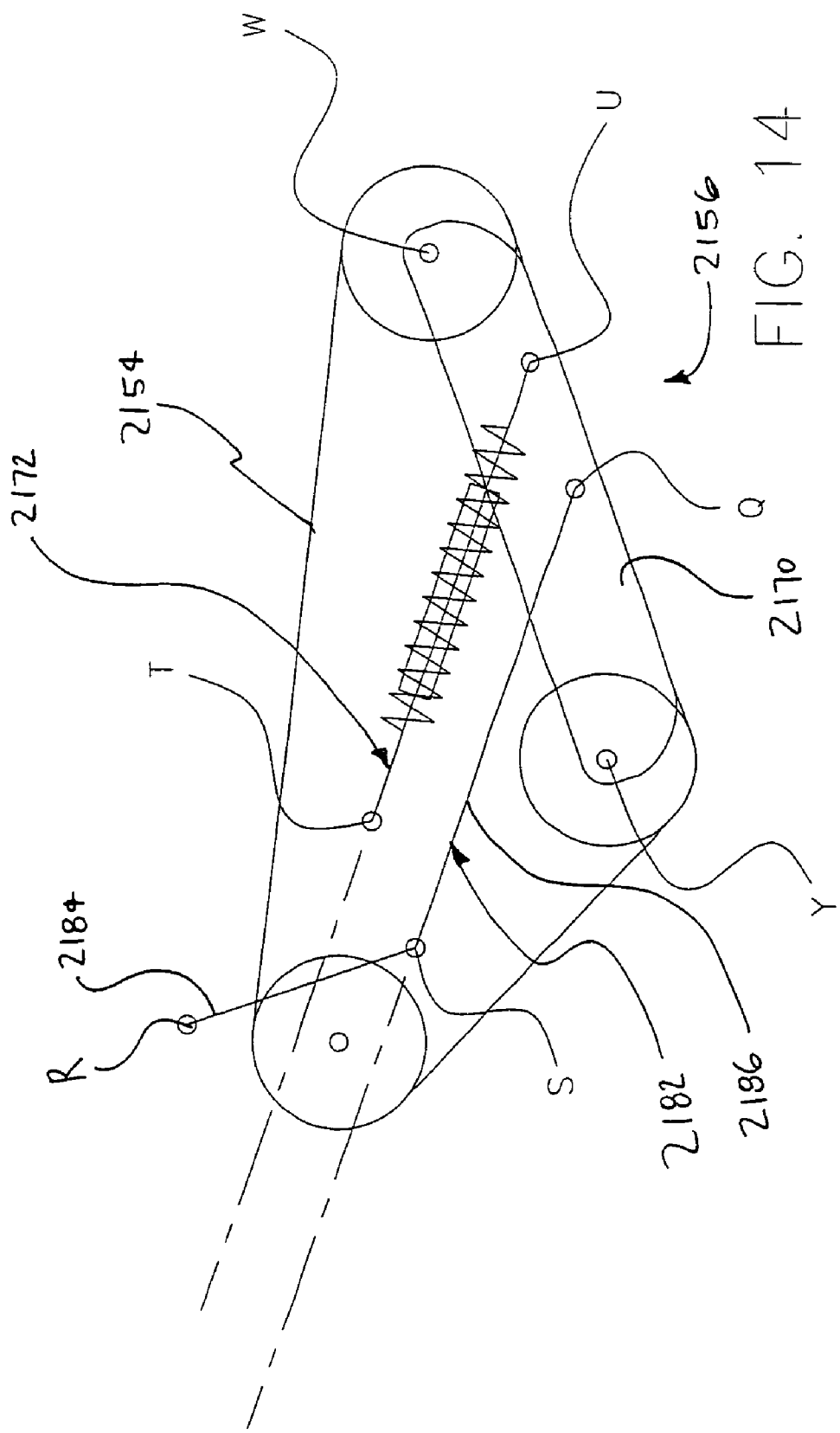
FIG. 14 is an enlarged side view illustrating first rear suspension and first drive track shown in the previous figure.

FIG. 14 is an enlarged side view illustrating first rear suspension 2156 and first drive track 2154 shown in the previous figure. In the embodiment of FIG. 14, first rear suspension 2156 is shown in a reference state. Also in the embodiment of FIG. 14, first drive track 2154 is shown assuming a first shape.

In the embodiment of FIG. 14, first rear suspension 2156 comprises a suspension arm 2182 and a strut 2172. In the exemplary embodiment of FIG. 14, suspension arm 2182 comprises a first leg 2184 and a second leg 2186. A distal portion of second leg 2186 is pivotally connected to a slide frame 2170 at a pivot axis Q. A distal portion of first leg 2184 is pivotally connected to a spring assembly 2188 at a pivot axis R. Suspension arm 2182 is pivotally connected to a vehicle chassis at a pivot axis S.

A proximal portion of strut 2172 is pivotally coupled to the vehicle chassis at a pivot axis T. A distal portion of strut 2172 is pivotally coupled to slide frame 2170 at a pivot axis U. In the embodiment of FIG. 14, strut 2172 is generally parallel to second leg 2186 of suspension arm 2182. Also in the embodiment of FIG. 14, the distance between pivot axis T and pivot axis U is substantially equal to the distance between pivot axis S and pivot axis Q.

Figure 15:
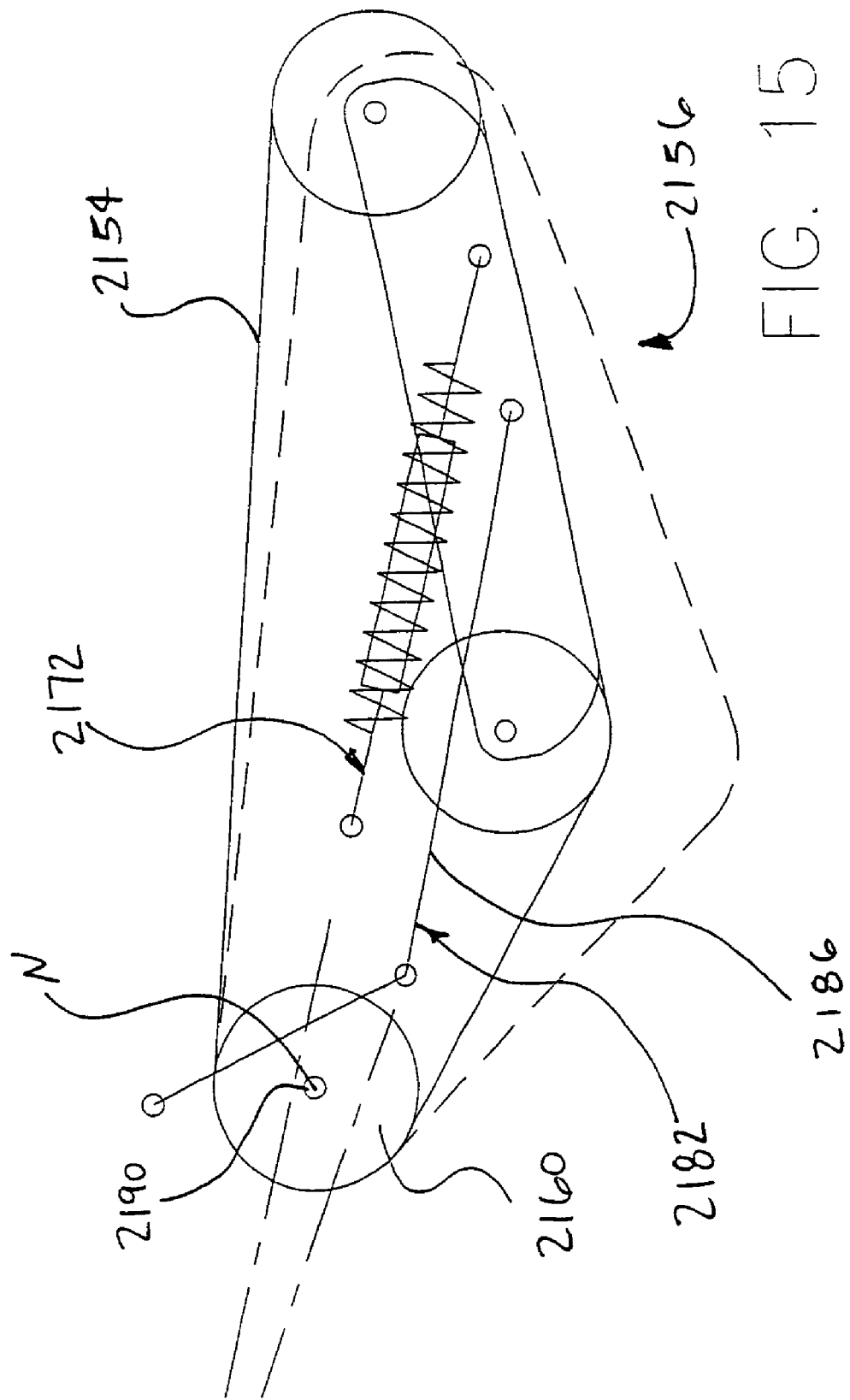
FIG. 15 is an additional enlarged side view illustrating first rear suspension and first drive track shown in the previous figure.

FIG. 15 is an additional enlarged side view illustrating first rear suspension 2156 and first drive track 2154 shown in the previous figure. In the embodiment of FIG. 15, first rear suspension 2156 is shown in a deflected state. Also in the embodiment of FIG. 15, first drive track 2154 is shown assuming a second shape. The first shape of first drive track 2154 is shown with dashed lines in FIG. 15 for purposes of illustration. With reference to FIG. 15, it will be appreciated that the first shape of first drive track 2154 and the second shape of first drive track 2154 are both generally triangular.

Drive sprocket 2160 is shown disposed about a drive shaft 2190. In the embodiment of FIG. 15, drive sprocket 2160 and drive shaft 2190 both rotate about a rotational axis N. In FIG. 15, a longitudinal axis of second leg 2186 of suspension arm 2182 is shown extending below rotational axis N. Also in FIG. 15, a longitudinal axis of strut 2172 can be seen extending above rotational axis N.

Figure 16:
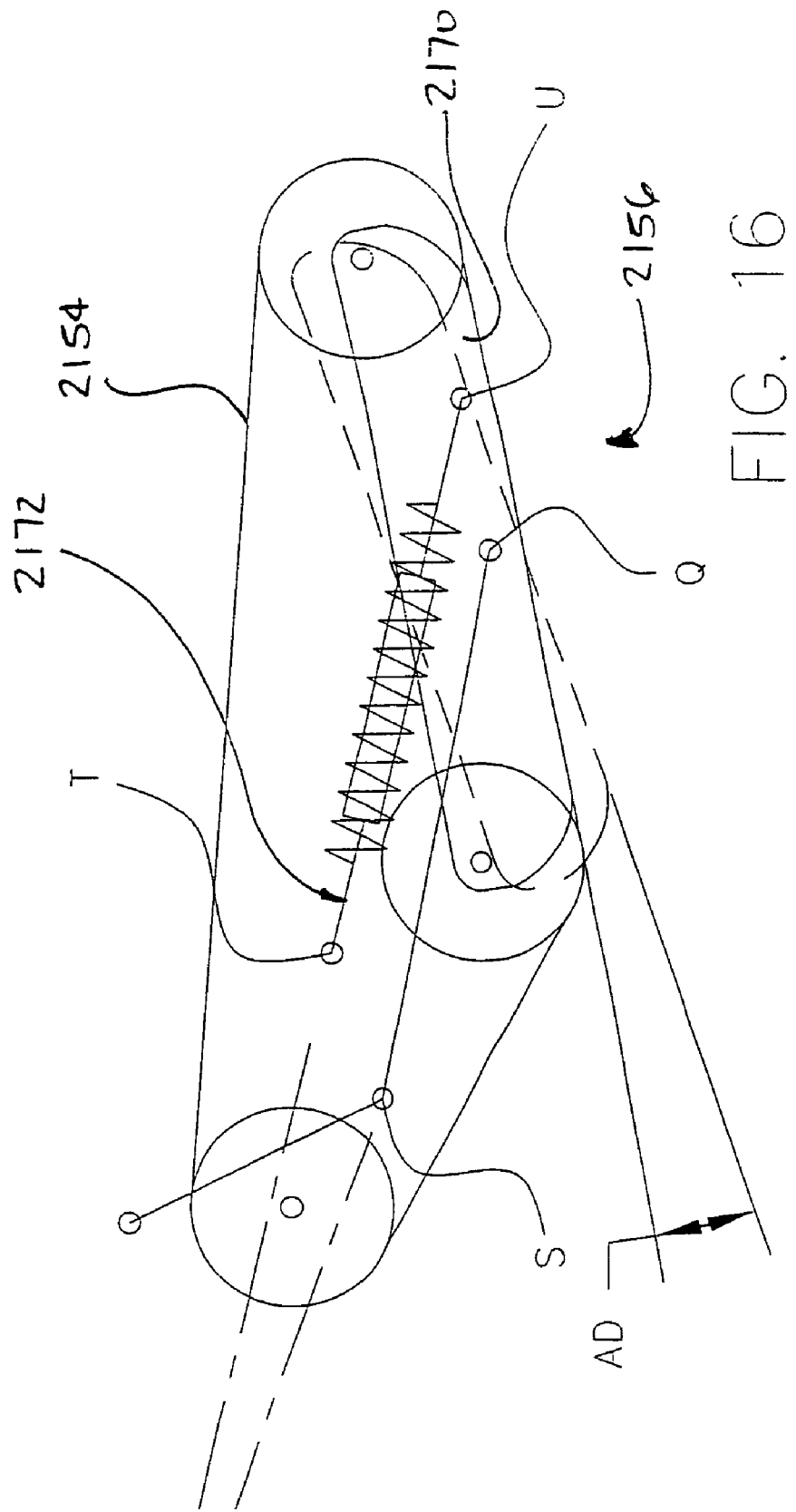
FIG. 16 is an additional enlarged side view illustrating first rear suspension and first drive track shown in the previous figure.

FIG. 16 is an additional enlarged side view illustrating first rear suspension 2156 and first drive track 2154 shown in the previous figure. In the embodiment of FIG. 16, first rear suspension 2156 is shown in a deflected state and first drive track 2154 is shown assuming a second shape. A reference angular orientation of slide frame 2170 is shown with dashed lines in FIG. 16 for purposes of illustration. The reference angular orientation illustrated in FIG. 16 generally corresponds to the angular orientation of slide frame 2170 illustrated in FIG. 14.

In some advantageous embodiments of the present invention, slide frame 2170 is free rotate about pivot axis Q as suspension first rear suspension 2156 moves from a reference state to a deflected state. In the exemplary embodiment of FIG. 16, slide frame 2170 has rotated by an angle AD. In some embodiments of the present invention, strut 2172 is adapted to expand and contract, thus facilitating rotation of slide frame 2170 about pivot axis Q. In the embodiment of FIG. 16, the distance between pivot axis S and pivot axis Q is slightly greater than the distance between pivot axis T and pivot axis U. Embodiments of the present invention are possible in which strut 2172 is biased to assume a position at which the distance between pivot axis T and pivot axis U is substantially equal to the distance between pivot axis S and pivot axis Q.

In some advantageous embodiments of the present invention, a trailing angle defined by an inside surface of first drive track 2154 may become smaller when first rear suspension 2156 assumes a deflected state. When the trailing angle is relatively large, turning of a vehicle including first rear suspension 2156 may be facilitated. When the trailing angle is relatively small, first drive track 2154 may contact the ground across a larger footprint area.

Figure 17:
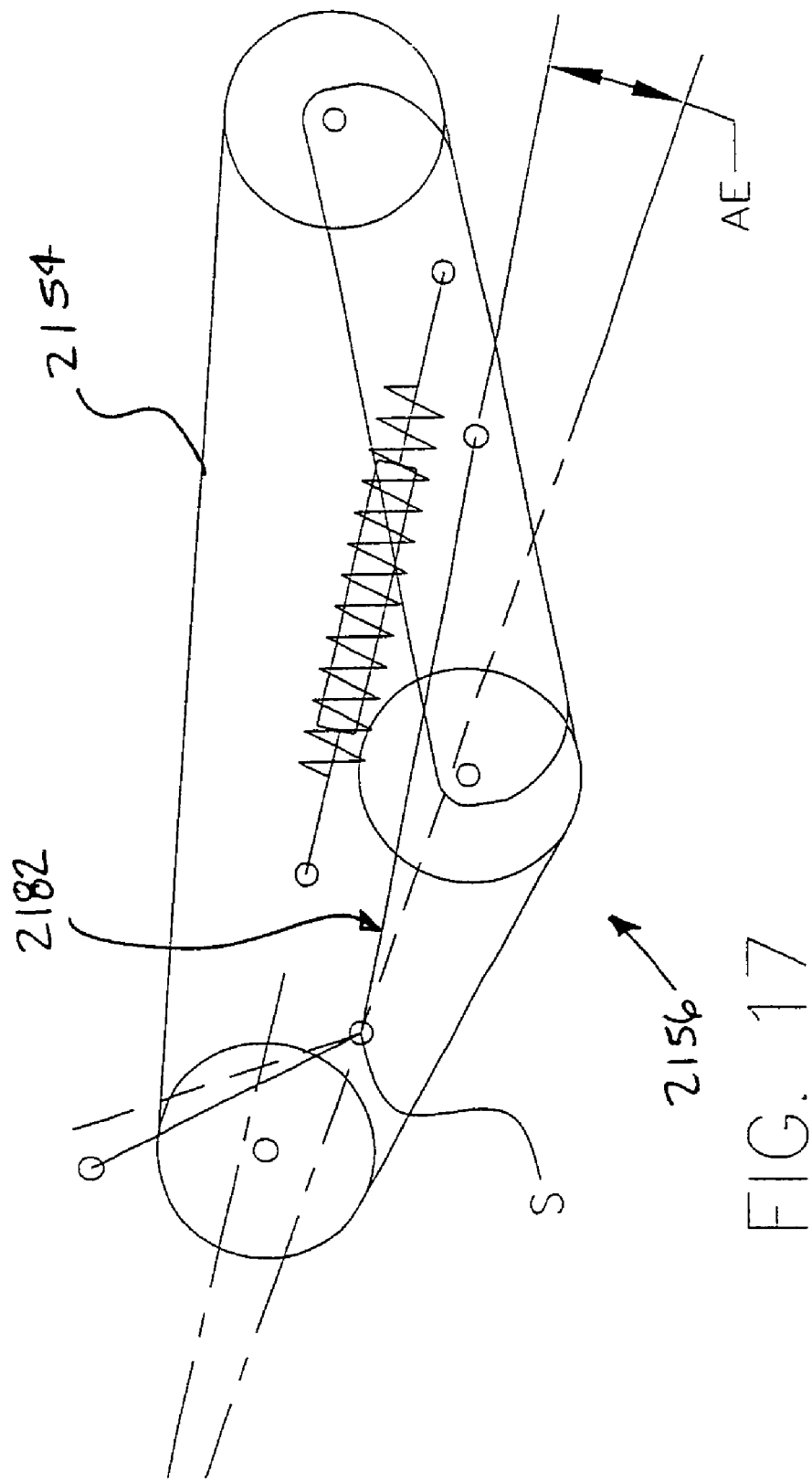
FIG. 17 is an additional enlarged side view illustrating first rear suspension and first drive track shown in the previous figure.

FIG. 17 is an additional enlarged side view illustrating first rear suspension 2156 and first drive track 2154 shown in the previous figure. A reference position of suspension arm 2182 is shown with dashed lines in FIG. 17 for purposes of illustration. The reference position illustrated in FIG. 17 generally corresponds to the position of suspension arm 2182 illustrated in FIG. 14. In some advantageous embodiments of the present invention, suspension arm 2182 is free to rotate about pivot axis S as first rear suspension 2156 moves from a reference state to a deflected state. In the exemplary embodiment of FIG. 17, suspension arm 2182 has rotated by and angle AE.

A vehicle in accordance with some useful embodiments of the present invention comprises the at least one lower idler wheel that is biased away from a chassis of the vehicle by a first suspension force having a first spring rate and at least one upper idler wheel that is biased away from the chassis by a second suspension force having a second spring rate. In some advantageous embodiments, the first spring rate is greater than the second spring rate.

Figure 18:
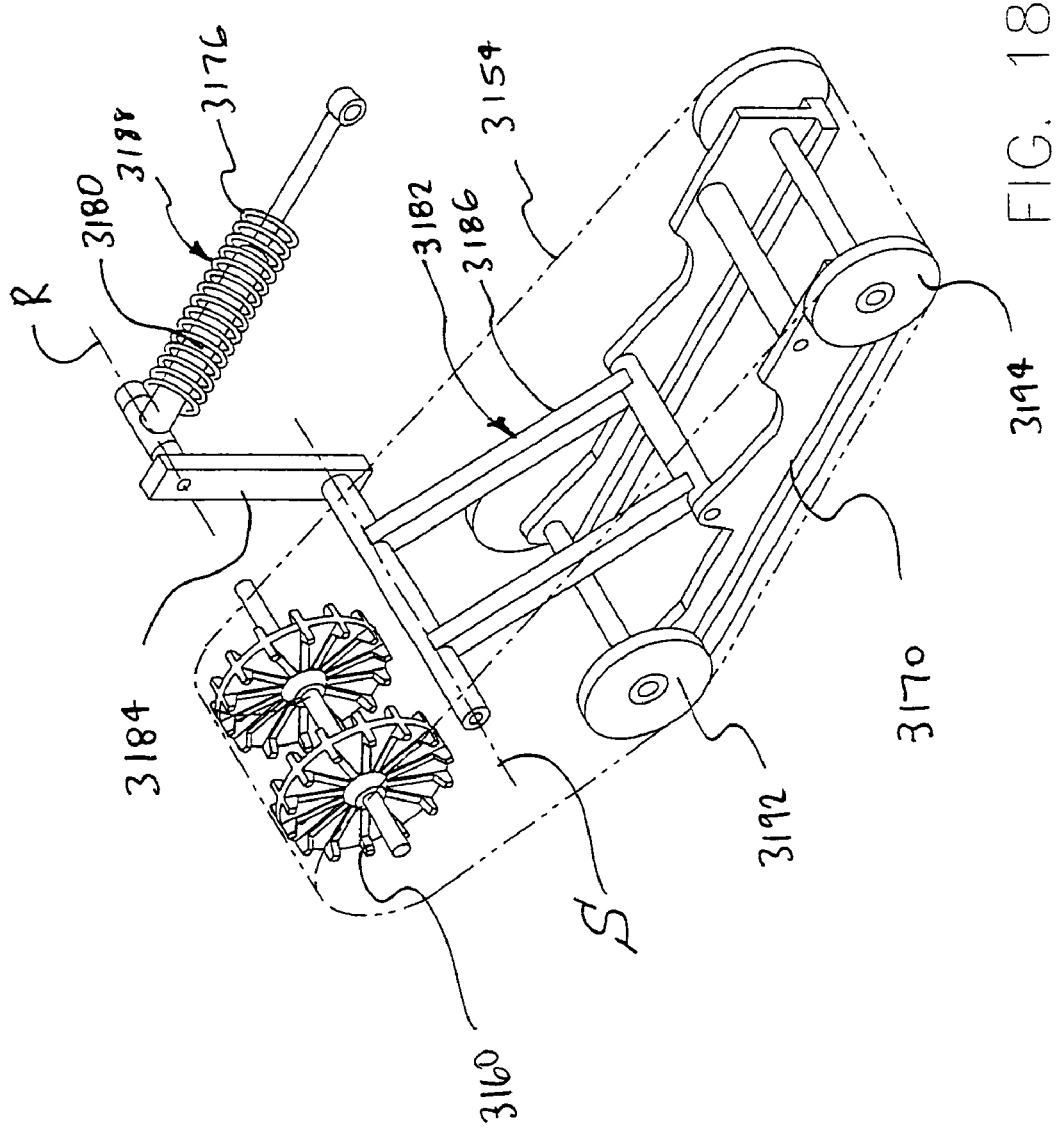
FIG. 18 is an isometric view illustrating an assembly in accordance with an additional exemplary embodiment of the present invention.

FIG. 18 is an isometric view illustrating an assembly in accordance with an additional exemplary embodiment of the present invention. The assembly of FIG. 18 includes a first drive track 3154 that is disposed about a drive sprocket 3160, a first idler wheel 3192 and a second idler wheel 3194 such that first drive track 3154 assumes a generally triangular shape. In the embodiment of FIG. 18, first idler wheel 3192 and second idler wheel 3194 are rotatably supported by a slide frame 3170.

The assembly of FIG. 18 also includes a suspension arm 3182 comprising a first leg 3184 and a second leg 3186. A proximal portion of second leg 3186 may be pivotally coupled to a chassis of a vehicle so as to pivot about a pivot axis S. The assembly of FIG. 18 also includes a spring assembly 3188. One end of spring assembly 3188 is pivotally coupled to a distal portion of first leg 3184 of suspension arm 3182 at a pivot axis R. Another end of spring assembly 3188 may be pivotally coupled to a chassis of a vehicle. In the embodiment of FIG. 18, spring assembly 3188 comprises a shock absorber 3180 and a spring 3176 disposed about shock absorber 3180.

Figure 19:
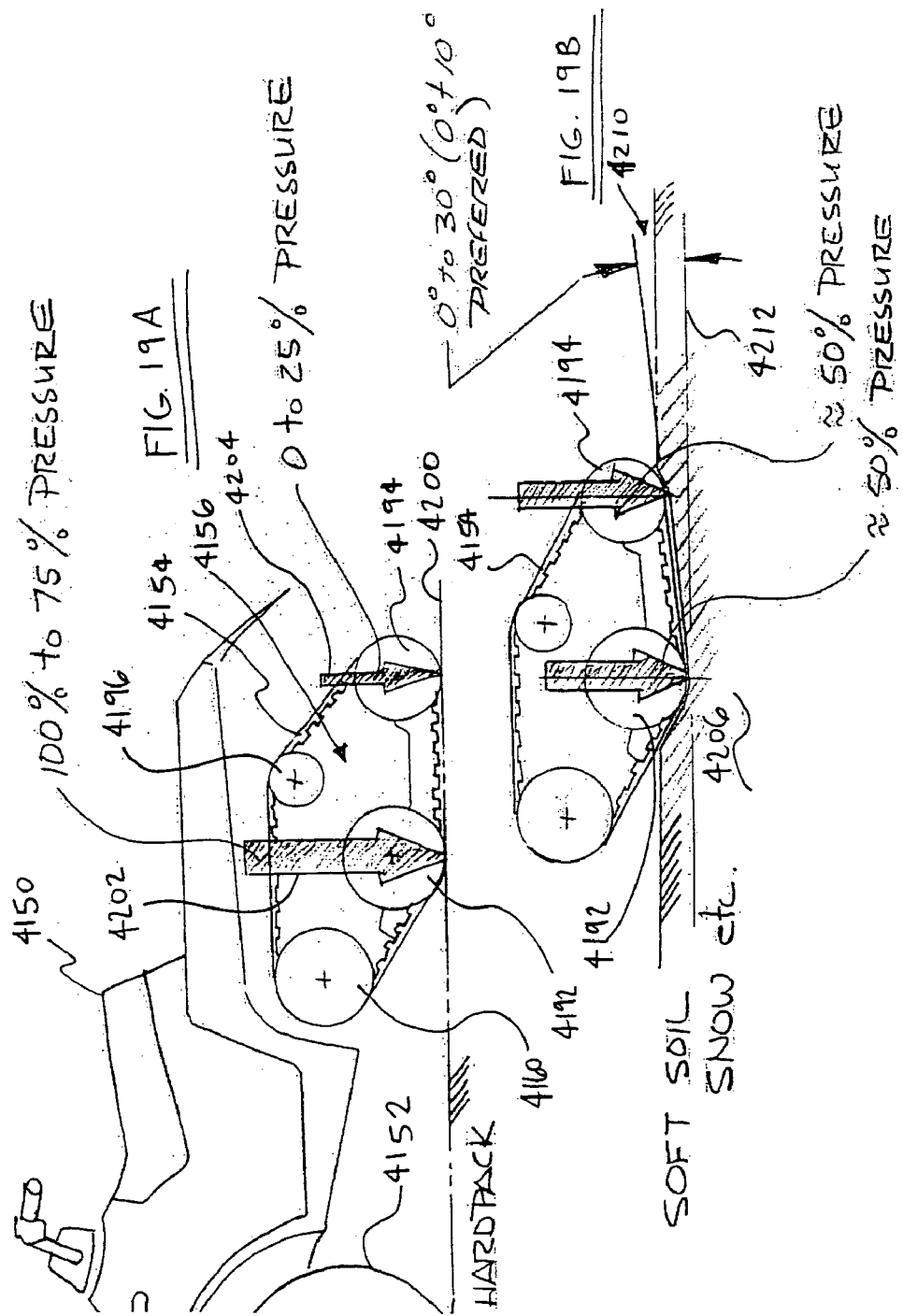
FIG. 19A is a side view showing a vehicle in accordance with an additional exemplary embodiment of the present invention.
FIG. 19B is a detail view illustrating a portion of the vehicle shown in the previous figure.

FIG. 19A is a side view showing a vehicle 4150 in accordance with an additional exemplary embodiment of the present invention. Vehicle 4150 comprises a first front wheel 4152 and a first drive track 4154 that is supported by a first rear suspension 4156. With reference to FIG. 19A, it will be appreciated that first drive track 4154 is disposed about a drive sprocket 4160, a first idler wheel 4192, a second idler wheel 4194 and a third idler wheel 4196 such that first drive track 4154 assumes a parallelogram-like shape. In the embodiment of FIG. 19A, vehicle 4150 is shown traversing a hardpack surface 4200. A larger arrow 4202 is shown in FIG. 19A to illustrate a portion of the weight of vehicle 4150 that is supported by a portion of first drive track 4154 proximate first idler wheel 4192. In some advantageous embodiments of the present invention, first rear suspension 4156 is configured such that one hundred percent to seventy five percent of the weight of vehicle 4150 is supported by a portion of first drive track 4154 proximate first idler wheel 4192. A smaller arrow 4204 is shown in FIG. 19A to illustrate a portion of the weight of vehicle 4150 that is supported by a portion of first drive track 4154 proximate second idler wheel 4194. In some advantageous embodiments of the present invention, first rear suspension 4156 is configured such that zero percent to twenty five percent of the weight of vehicle 4150 is supported by a portion of first drive track 4154 proximate second idler wheel 4194.

FIG. 19B is a detail view illustrating a portion of a vehicle 4150 shown in the previous figure. In the embodiment of FIG. 19B, first drive track 4154 of vehicle 4150 is shown traversing relatively soft terrain 4206. Soft terrain 4206 may comprise, for example, soft soil, snow, sand, and the like. With reference to FIG. 19B, it will be appreciated that a portion of first drive track 4154 proximate first idler wheel 4192 has penetrated terrain 4206 to a greater extent than a portion of first drive track 4154 proximate second idler wheel 4194. Two arrows are used to illustrate the pressure applied between first drive track 4154 and terrain 4206. In some advantageous embodiments of the present invention, pressure is distributed substantially evenly across a portion of first drive track 4154 extending between first idler wheel 4192 and second idler wheel 4194 when vehicle 4150 is traversing relatively soft terrain.

In the embodiment of FIG. 19B, a portion of first drive track 4154 defines a trailing angle 4210 with a horizontal reference plane 4212. In some useful embodiments of the present invention, trailing angle 4210 is between about zero degrees and about thirty degrees. In some particularly useful embodiments of the present invention, trailing angle 4210 is between about zero degrees and about ten degrees.

Figure 20:
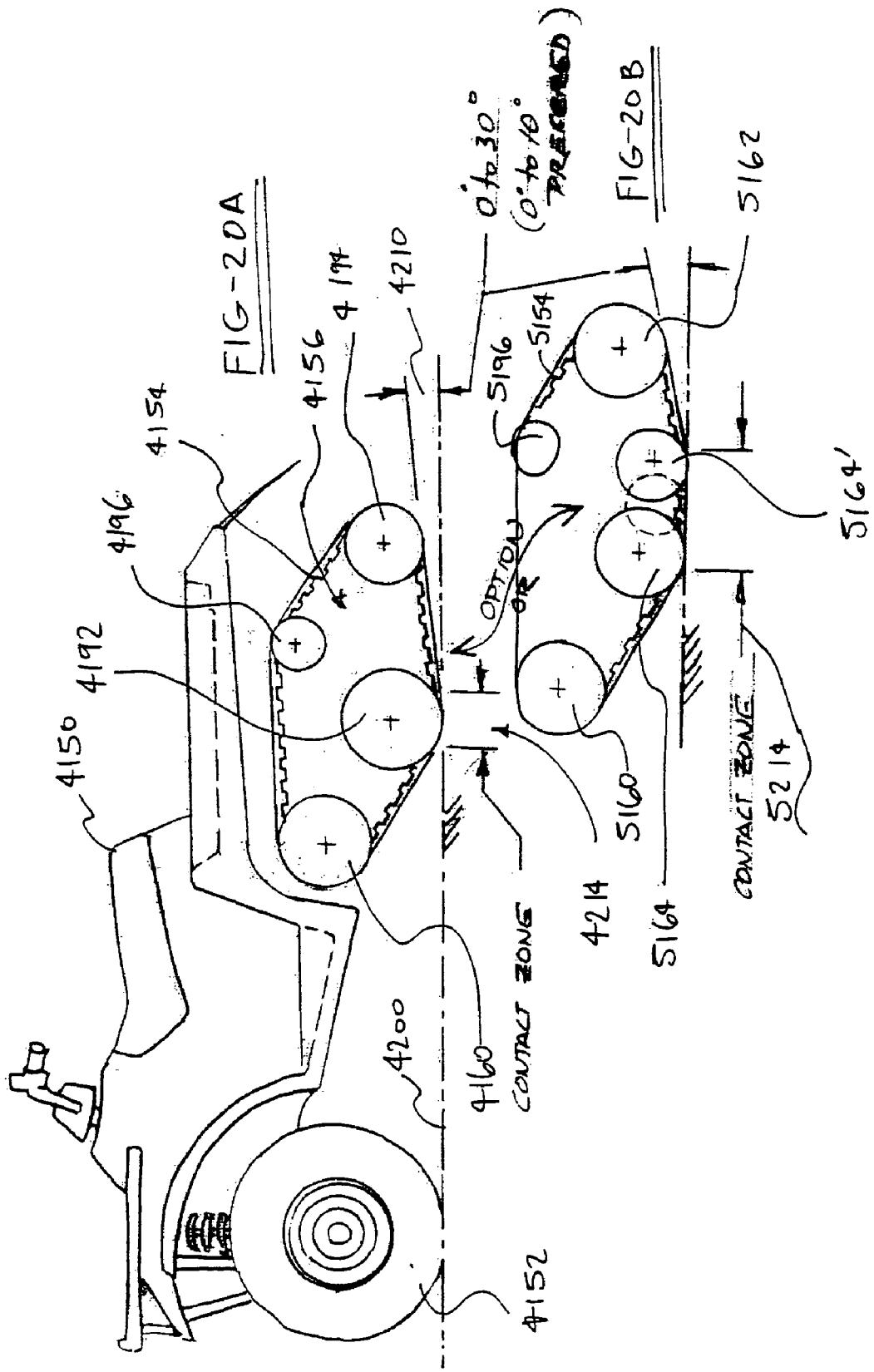
FIG. 20A is an additional side view illustrating the vehicle shown in the previous figure.
FIG. 20B is a detail view of an assembly illustrating an additional exemplary embodiment of the present invention.

FIG. 20A is an additional side view illustrating vehicle 4150 shown in the previous figure. In the embodiment of FIG. 20A, vehicle 4150 is shown traversing a hardpack surface 4200. In the embodiment of FIG. 20, hardpack surface 4200 and a portion of first drive track 4154 define a trailing angle 4210. In some useful embodiments of the present invention, trailing angle 4210 is between about zero degrees and about thirty degrees. In some particularly useful embodiments of the present invention, trailing angle 4210 is between about zero degrees and about ten degrees. A contact zone 4214 is illustrated in FIG. 20A. In the embodiment of FIG. 20A, contact zone 4214 comprises a portion of first drive track 4154 proximate first idler wheel 4192.

In the embodiment of FIG. 20A, vehicle 4150 comprises a first front wheel 4152 and a first drive track 4154 that is supported by a first rear suspension 4156. With reference to FIG. 20A, it will be appreciated that first drive track 4154 is disposed about a drive sprocket 4160, a first idler wheel 4192, a second idler wheel 4194 and a third idler wheel 4196 such that first drive track 4154 assumes a parallelogram-like shape.

FIG. 20B is a detail view of an assembly illustrating an additional exemplary embodiment of the present invention. The assembly of FIG. 20B includes a first lower idler wheel 5164, a second lower idler wheel 5164', an upper idler wheel 5162, a third idler wheel 5196, and a drive sprocket 5160. A first drive track 5154 is disposed about first lower idler wheel 5164, second lower idler wheel 5164', upper idler wheel 5162, third idler wheel 5196, and drive sprocket 5160. A contact zone 5214 is illustrated in FIG. 20B. In the embodiment of FIG. 20A, contact zone comprises a portion of first drive track 5154 extending proximate and extending between first lower idler wheel 5164 and second lower idler wheel 5164. With reference to FIG. 20A and FIG. 20B, it will be appreciated that the contact zone shown in FIG. 20B is generally larger than the contact zone shown in FIG. 20A.

Figure 21:
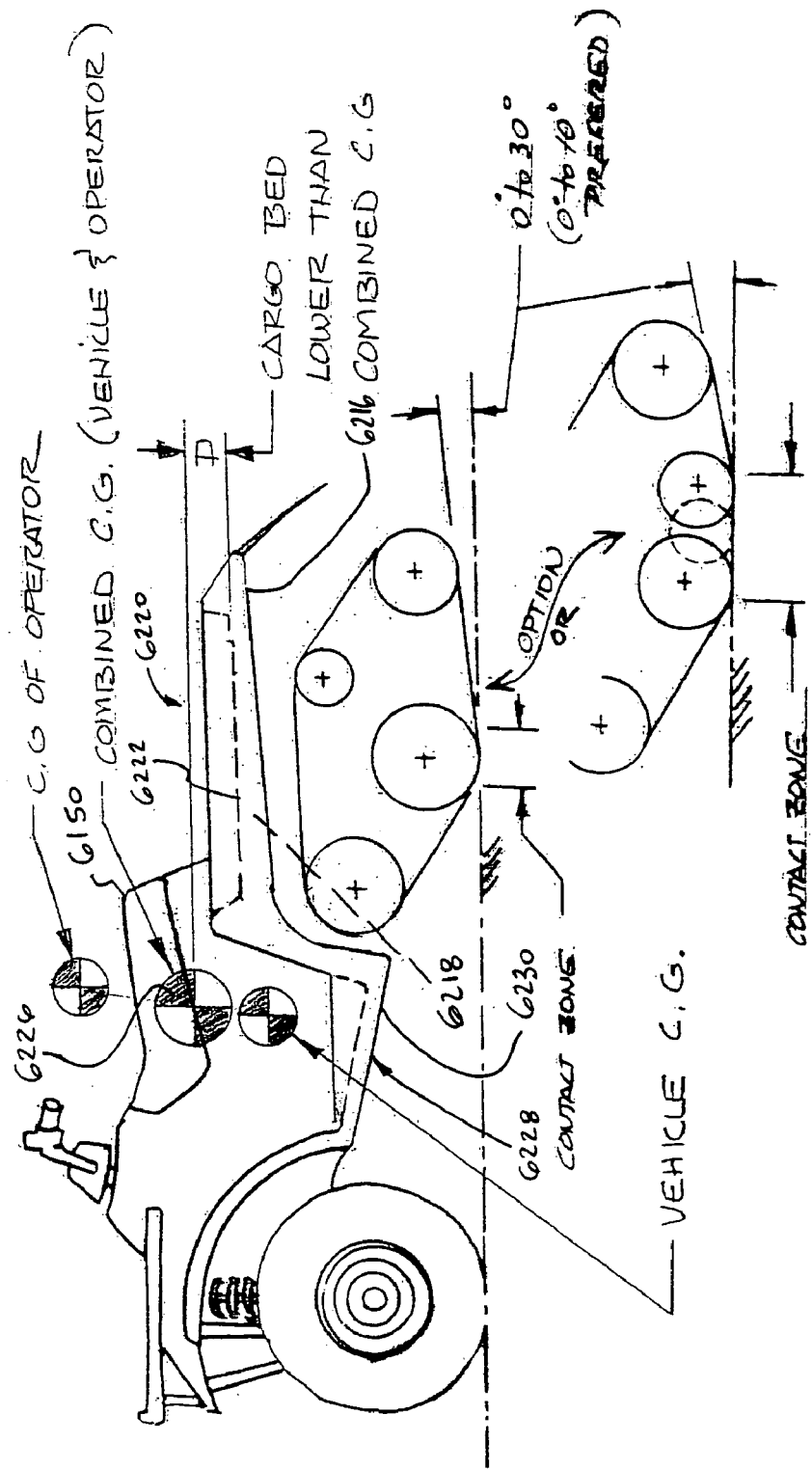
FIG. 21 is an additional side view illustrating a vehicle in accordance with an exemplary embodiment of the present invention.

FIG. 21 is an additional side view illustrating a vehicle 6150 in accordance with an exemplary embodiment of the present invention. Vehicle 6150 of FIG. 21 comprises a shell 6216. In the embodiment of FIG. 21, it may be appreciated that an inner surface of shell 6216 defines a cavity 6218. Also in FIG. 21, it may be appreciated that an outer surface 6230 of shell 6216 defines a carrier 6220 including a cargo carrying surface 6222. With reference to FIG. 21, it may be appreciated that cargo carrying surface 6222 is disposed below a center of gravity 6226 of the combined mass of vehicle 6150 and a vehicle operator by a distance D. In certain applications, placing cargo carrying surface 6222 in a relatively low location prevents cargo resting on cargo carrying surface 6222 from unduly raising a combined (i.e., cargo plus vehicle) center of gravity. In the embodiment of FIG. 21, a forward portion of shell 6216 defines a ramp 6228 that is disposed generally in front of first drive track 6154. Ramp 6228 may be positioned and dimension so as to pack down terrain before that terrain is traversed by a drive track of vehicle 6150.

Numerous characteristics and advantages of the invention covered by this document have been set forth in the foregoing description. It will be understood, however, that this disclosure is, in many respects, only illustrative. Changes may be made in details, particularly in matters of shape, size and ordering of steps without exceeding the scope of the invention. The invention's scope is, of course, defined in the language in which the appended claims are expressed.

What is claimed is:

1. An all terrain vehicle comprising:
   a chassis including a front portion and a rear portion;
   a first front wheel coupled to the front portion of the chassis by a first front suspension;
   a first front tire coupled to the first front wheel;
   a second front wheel coupled to the front portion of the chassis by a second front suspension;
   a second front tire coupled to the second front wheel;
   a seat attached to the chassis between the front and rear portions of the chassis; and
   a shell attached to the rear portion of the chassis, the shell defining a sealed cavity and including an outer surface including an upper portion having a depression formed therein;
   the sealed cavity isolated from the seat and the first and second front tires and having a portion extending above the rear portion of the chassis; and
   almost an entirety of the sealed cavity being confined to a zone defined by the rear portion of the chassis.

2. The all terrain vehicle of claim 1, further including a drive track supported by a track suspension coupled to the chassis;
   at least a portion of the-drive track extending below the cavity.

3. The all terrain vehicle of claim 1, wherein the depression of the upper portion of the outer surface of the shell includes a cargo carrying surface, on which cargo may rest, the cargo carrying surface being disposed below a centroid of the vehicle.

4. The all terrain vehicle of claim 1, wherein the cavity is filled with air.

5. The all terrain vehicle of claim 1, wherein the cavity extends substantially across a width of the vehicle.

6. The all terrain vehicle of claim 1, wherein a lowermost portion of the cavity is disposed below an uppermost surface of the first and second front tires.

7. The all terrain vehicle of claim 1, wherein a volume of the cavity is approximately equal to or greater than a combined volume enclosed by the first and second front tires.

8. The all terrain vehicle of claim 1, wherein the sealed cavity is disposed below a centroid of the vehicle.

9. An all-terrain vehicle, comprising:
   a centroid;
   a chassis;
   a first front wheel coupled to the chassis by a first front suspension and a second front wheel coupled to the chassis by a second front suspension, the first and second front wheel positioned forward of the centroid of the vehicle;
   a first tire coupled to the first front wheel and a second tire coupled to the second front wheel, the first and second tires providing a first buoyancy force about the centroid;
   a drive track supported by a rear suspension; and a shell coupled to the chassis, the shell defining a sealed cavity;

an entirety of the sealed cavity disposed above the drive track and almost an entirety of the cavity disposed rearward of the centroid of the vehicle, the sealed cavity providing a second buoyancy force about the centroid.

10. The vehicle of claim 9, wherein the shell further includes an outer surface defining a portion of a cargo carrier.

11. The vehicle of claim 10, wherein the outer surface defining a portion of the cargo carrier is disposed below the centroid of the vehicle.

12. The vehicle of claim 9, wherein the cavity extends substantially across a width of the vehicle.

13. The vehicle of claim 9, wherein a lowermost portion of the cavity is disposed below an uppermost surface of the first and second front tires.

14. The vehicle of claim 13, wherein the lowermost portion of the cavity is further disposed above a midway point of the first and second front tires.

15. The vehicle of claim 9, wherein a volume of the cavity is approximately equal to or greater than a combined volume enclosed by the first and second front tires.

16. The all terrain vehicle of claim 9, wherein the sealed cavity is disposed below the centroid.

17. An all-terrain vehicle, comprising:

a chassis;

at least two ground engaging members to support a first end portion of the vehicle relative to the ground; each ground engaging member being coupled to the chassis and having a surface adapted to engage the ground;

at least a third ground engaging member to support a second end portion of the vehicle relative to the ground; the third ground engaging member being coupled to the chassis and having a surface adapted to engage the ground; and a seat disposed between the first end portion of the vehicle and the second end portion of the vehicle;

wherein one of the first end portion and the second end portion includes a sealed enclosed space associated with each respective ground engaging member which provides generally an entire buoyancy force associated with the respective end portion of the vehicle when the vehicle is partially immersed in a fluid and the other of the first end portion and the second end portion includes a separate sealed enclosed space not associated with the respective ground engaging member or ground engaging members which provides generally an entire buoyancy force associated with the respective end portion of the vehicle when the vehicle is partially immersed in the fluid.

18. The all terrain vehicle of claim 17, wherein the separate sealed enclosed space is disposed below the centroid of the vehicle.

19. The all terrain vehicle of claim 17, wherein the separate sealed enclosed space is an interior of a shell supported by the chassis.

20. The all terrain vehicle of claim 19, wherein the shell includes a cargo carrying surface.

21. The all terrain vehicle of claim 20, wherein the cargo carrying surface is positioned in a depression in an upper portion of the shell.

22. The all terrain vehicle of claim 20, wherein the cargo carrying surface is positioned below the centroid of the vehicle.

* * * * *